US012764010B2

(12) United States Patent
Tadayon et al.

(10) Patent No.: US 12,764,010 B2
(45) Date of Patent: Oct. 13, 2026

(54) METHOD, APPARATUS, AND MEDIUM FOR MODULATION OF WAVEFORM IN FRACTIONAL DOMAIN FOR INTEGRATED SENSING AND COMMUNICATION

(71) Applicant: HUAWEI TECHNOLOGIES CO., LTD., Shenzhen (CN)

(72) Inventors: Navid Tadayon, Kanata (CA); Alireza Bayesteh, Kanata (CA); Jianglei Ma, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 503 days.

(21) Appl. No.: 18/459,409

(22) Filed: Aug. 31, 2023

(65) Prior Publication Data

US 2023/0412442 A1 Dec. 21, 2023

Related U.S. Application Data

(63) Continuation of application No. PCT/CN2021/081938, filed on Mar. 20, 2021.

(51) Int. Cl.
*H04L 27/26* (2006.01)
*G01S 7/00* (2006.01)
(Continued)

(52) U.S. Cl.
CPC ...... *H04L 27/2636* (2013.01); *H04L 27/2602* (2013.01)

(58) Field of Classification Search
CPC ............. H04L 27/2636; H04L 27/2602; H04L 27/2639; H04L 27/261; H04L 27/12; G01S 7/006; H04B 2001/6912
(Continued)

(56) References Cited

U.S. PATENT DOCUMENTS 11,463,842 B2 10/2022 Tadayon et al.
2016/0277083 A1* 9/2016 Koike-Akino ....... H04B 7/0615
(Continued)

FOREIGN PATENT DOCUMENTS

CN 101827060 A 9/2010
CN 106772350 A 5/2017
(Continued)

OTHER PUBLICATIONS

Massimiliano (Max) Martone:"A Multicarrier System Based on the Fractional Fourier Transform for Time-Frequency-Selective Channels", IEEE Transactions on Communications, vol. 49, No. 6, Jun. 2001, total 10 pages.
(Continued)

*Primary Examiner* — Xuan Lu
(74) *Attorney, Agent, or Firm* — Slater Matsil, LLP

(57) ABSTRACT

A method for an apparatus comprises obtaining a frequency modulation parameter corresponding to a frequency change rate of a frequency-modulated subcarrier; generating an Orthogonal Frequency Division Multiplexing (OFDM)-based waveform signal comprising a plurality of frequency-modulated subcarriers, the plurality of frequency-modulated subcarriers modulated according to the obtained frequency modulation parameter; and outputting the OFDM-based waveform signal. A plurality of modulated symbols may be generated from a sequence of bits and the modulated symbols may be precoded, according to the frequency modulation parameter, to generate precoded symbols. The OFDM-based waveform signal may then be generated from the precoded symbols. A corresponding method for detecting and decoding the waveform signal is also provided.

18 Claims, 19 Drawing Sheets

(51) Int. Cl.
*H04B 1/69* (2011.01)
*H04L 27/12* (2006.01)

(58) Field of Classification Search
USPC .......................................................... 370/330
See application file for complete search history.

(56) References Cited

U.S. PATENT DOCUMENTS

| | | | | |
|---|---|---|---|---|
| 2017/0026215 | A1* | 1/2017 | Zhao | H04L 47/125 |
| 2017/0126454 | A1 | 5/2017 | Huan et al. | |
| 2018/0309598 | A1* | 10/2018 | Pena Campos | H04L 25/0224 |
| 2020/0336270 | A1* | 10/2020 | Lu | H04L 5/0051 |
| 2020/0345969 | A1* | 11/2020 | Choi | G16H 20/40 |
| 2021/0111938 | A1* | 4/2021 | Sahin | H04L 27/2626 |
| 2021/0344538 | A1* | 11/2021 | Pados | H04B 11/00 |
| 2023/0189139 | A1* | 6/2023 | Priyanto | H04L 27/26025 370/311 |
| 2023/0367005 | A1* | 11/2023 | Hwang | G01S 13/88 |

FOREIGN PATENT DOCUMENTS

| | | | | |
|---|---|---|---|---|
| CN | 109004984 A | * | 12/2018 | H04B 10/25891 |
| CN | 111585688 A | | 8/2020 | |

OTHER PUBLICATIONS

Tianhong Zhang et al: "Research on a Unified Framework Based on Linear Frequency Modulation and Orthogonal Frequency-Division Multiplexing",May 21, 2019, total 7 pages.

* cited by examiner

METHOD, APPARATUS, AND MEDIUM FOR MODULATION OF WAVEFORM IN FRACTIONAL DOMAIN FOR INTEGRATED SENSING AND COMMUNICATION

CROSS-REFERENCE TO RELATED APPLICATION

This application is a continuation of International Application No. PCT/CN2021/081938, filed on Mar. 20, 2021, and entitled "Method, Apparatus, and Medium for Modulation of Waveform in Fractional Domain for Integrated Sensing and Communication," the disclosure of which is hereby incorporated by reference in its entirety.

FIELD

The present application relates to wireless communication with modulated waveforms, and more specifically to communicating and sensing waveforms modulated in the fractional domain.

BACKGROUND

Waveform design, particularly signal modulation, is an important and fundamental aspect in wireless communications. The success of the fourth generation (4G) of cellular networks, or long-term-evolution (LTE), may be attributed in large part to the adoption of the signal modulation technique known as orthogonal frequency division multiplexing (OFDM), also known as an OFDM waveform, which balances the efficiency in data communication and demands for energy and computation resources.

Multi-dimensional efficiency is desirable in waveform designs and signal modulation techniques because wireless communications occur in a shared communications environment where one user's transmission can be another user's interference. Moreover, it is desirable to reduce the required computation resources for detecting and estimating modulated signals for user mobility, form-factor, and battery (energy) considerations.

For example, integrated sensing and communication (also known as integrated communication and sensing) is a desirable feature in existing and future communication systems, and it is desirable to provide improved waveform designs and signal modulation techniques for practical implementations of integrated sensing and communication.

SUMMARY

It has been recognized by the present inventors that existing Orthogonal Frequency Division Multiplexing (OFDM) modulation techniques for signal modulation are not sufficiently flexible for application in integrated sensing and communication within a wireless communications network. The present inventors realized that fractional modulation of the signals can provide increased flexibility and efficiency for integrated sensing and communication. For example, fractional modulation allows for more adjustable air interface parameters, which is beneficial for integrated sensing and communication. Thus, the present disclosure provides improved techniques for generating, transmitting, detecting, and processing waveforms based on modulation of signals in a fractional domain.

The present inventors have also realized that implementations of fractional modulation may utilize existing OFDM techniques so that practical implementations may be made by adapting or incorporating existing OFDM hardware and software components. For example, frequency-modulated OFDM waveform signals may be generated using, in part, conventional OFDM techniques, in a multi-stage modulation process. As an example solution, the input signal is precoded by fractional modulation before OFDM modulation. Such multiple-stage modulation allows flexible manipulation of the signals to be transmitted or received, to address various practical issues encountered during signal generation, transmission, reception, and detection. Such an approach can take at least some advantages of the benefits and conveniences provided by both fractional domain-based modulation and OFDM-based modulation of waveforms for wireless communication, and avoid or mitigate some of the drawbacks of a traditional OFDM modulation technique. Further, such an approach allows convenient switching between frequency-modulated OFDM and fixed-frequency OFDM, such as by turning ON and OFF the precoding operation.

The present inventors further recognized that some technical issues arise when the signals are communicated in a fractional domain instead of in a fixed frequency domain. For example, the communication channel may no longer be orthogonal and inter-carrier interference (ICI) may be significant with signal communication in a fractional domain. Thus, the present disclosure provides specific implementations to address the ICI problem, and other problems associated with signal deterioration or degradation, such as due to hardware imperfections or environmental variations. Specific implementations are also provided to simplify the structures of devices, e.g., transmitters or receivers, configured and adapted for fractional modulation. For example, practical solutions are provided to simplify detection and channel estimation operations in receivers. As an example solution, guard intervals may be used to simplify the receivers.

As noted above, to provide improved flexibility, adjustable parameters for fractional modulation are provided. For example, possible adjustable parameters may include how data symbols are embedded in fractional modulated signals, the fractional domain parameter(s) such as the order of the fractional domain or the overlapping factor of the subcarriers or chirp functions, the fractional spacing or subcarrier (chirp) spacing, or the like.

To enable fractional modulation for integrated sensing and communication, efficient signaling mechanisms are also provided, to allow efficient usage of the communicated fractional modulated signals, efficient usage of computation and communication resources, and flexibility for application in various use cases.

Accordingly, embodiments are disclosed in which a method for an apparatus comprises obtaining a frequency modulation parameter corresponding to a frequency change rate of a frequency-modulated subcarrier; generating an Orthogonal Frequency Division Multiplexing (OFDM)-based waveform signal comprising a plurality of frequency-modulated subcarriers, the plurality of frequency-modulated subcarriers modulated according to the obtained frequency modulation parameter; and outputting the OFDM-based waveform signal. The method may further comprise generating a plurality of modulated symbols from a sequence of bits; and precoding the plurality of modulated symbols, according to the frequency modulation parameter, to generate a plurality of precoded symbols; wherein the OFDM-based waveform signal is generated from the plurality of precoded symbols. The method may further comprise obtaining a fractional order $\alpha$ based on the frequency modulation parameter, wherein the precoding may comprise fractional domain Fourier transformation of the plurality of modulated symbols to generate the plurality of precoded symbols in a fractional domain of a fractional order [−(α−1)]. The precoding may comprise interleaving the plurality of modulated symbols with pilot symbols. Generation of the OFDM-based waveform signal may comprise interleaving the plurality of precoded symbols with pilot symbols. The precoding may comprise multiplication of the plurality of modulated symbols with a chirp function selected according to the frequency change rate. Generation of the plurality of modulated symbols from the sequence of bits may comprise generating a first plurality of modulated symbols from the sequence of bits, and discrete Fourier transform (DFT) precoding the first plurality of modulated symbols to generate a second plurality of modulated symbols; and the second plurality of modulated symbols may be precoded, according to the frequency modulation parameter, to generate the plurality of precoded symbols. The method may further comprise obtaining an overlap parameter for indicating an overlap between a first frequency-modulated subcarrier of the plurality of subcarriers and a second frequency-modulated subcarrier of the plurality of subcarriers, the overlap being in at least one of a time domain or a frequency domain. Obtaining the frequency modulation parameter may comprise receiving control signaling for indicating the frequency modulation parameter and at least one of a symbol duration, a frequency-modulated subcarrier spacing, or an overlap parameter. The method may further comprise transmitting control signaling for indicating the frequency modulation parameter and at least one of a symbol duration, a frequency-modulated subcarrier spacing, or an overlap parameter. The OFDM-based waveform signal may comprise a cyclic prefix (CP). The method may further comprise obtaining a frequency bandwidth parameter for indicating a frequency bandwidth associated with the plurality of frequency-modulated subcarriers.

Further embodiments are disclosed in which a method for an apparatus comprises obtaining a frequency modulation parameter corresponding to a frequency change rate of a frequency-modulated subcarrier; receiving an Orthogonal Frequency Division Multiplexing (OFDM)-based waveform signal comprising a plurality of frequency-modulated subcarriers, the plurality of frequency-modulated subcarriers modulated according to the frequency modulation parameter; and decoding the plurality of frequency-modulated subcarriers. The method may comprise obtaining a fractional order α based on the frequency modulation parameter, wherein the received OFDM-based waveform signal may be generated from a plurality of precoded symbols generated from fractional domain Fourier transformation, in a fractional domain of a fractional order [−(α−1)], of a plurality of modulated symbols. The plurality of modulated symbols may be interleaved with pilot symbols in the precoded modulated symbols, and the decoding may comprise channel equalization based on the pilot symbols. The plurality of precoded symbols may be interleaved with pilot symbols in the OFDM-based waveform signal, and the decoding may comprise channel equalization based on the pilot symbols. The method may further comprise obtaining an overlap parameter for indicating an overlap between a first frequency-modulated subcarrier of the plurality of subcarriers and a second frequency-modulated of the plurality of subcarriers, the overlap being in at least one of a time domain or a frequency domain. Obtaining the frequency modulation parameter may comprise receiving control signaling for indicating the frequency modulation parameter and at least one of a symbol duration, a frequency-modulated subcarrier spacing, or an overlap parameter. The method may further comprise transmitting control signaling for indicating the frequency modulation parameter and at least one of a symbol duration, a frequency-modulated subcarrier spacing, or an overlap parameter. The OFDM-based waveform signal may comprise a cyclic prefix (CP). The method may further comprise obtaining a frequency bandwidth parameter for indicating a frequency bandwidth associated with the plurality of frequency-modulated subcarriers.

Further embodiments are disclosed in which an apparatus comprises a memory to store processor-executable instructions; a processor to execute the store processor-executable instructions to cause the processor to perform a method described herein.

Further embodiments are disclosed in which a processor-readable medium storing thereon processor-executable instructions, the processor-executable instructions when executed by a processor causes the processor to perform a method disclosed herein.

BRIEF DESCRIPTION OF THE DRAWINGS

Embodiments will be described, by way of example only, with reference to the accompanying figures wherein.

DETAILED DESCRIPTION

Figure 1:
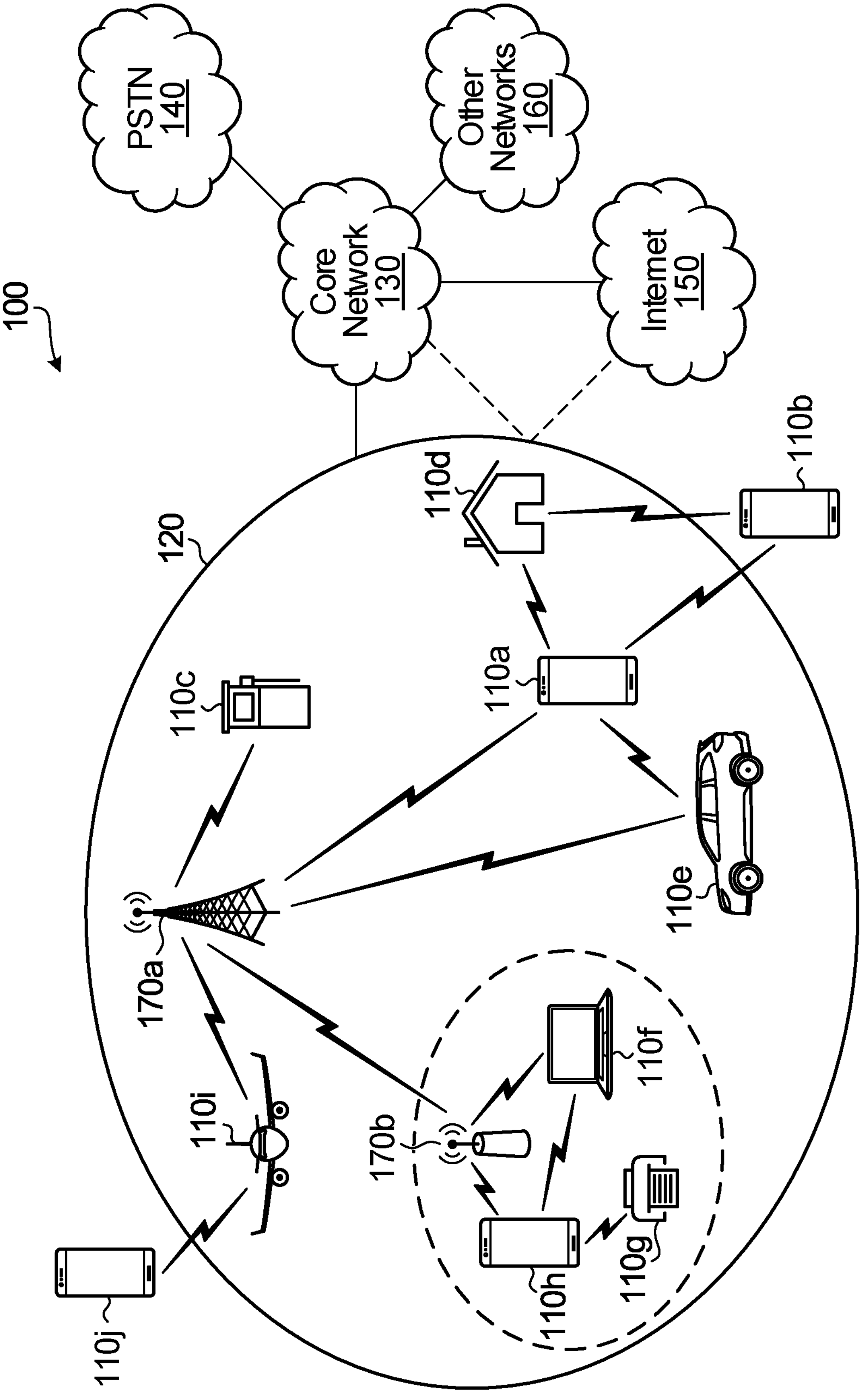
FIG. 1 is a schematic network diagram of an example communication system.

For illustrative purposes, specific example embodiments will now be explained in greater detail below in conjunction with the figures.

In brief overview, example embodiments described herein provide improved techniques for generating, transmitting, detecting, and processing waveforms based on modulation of signals in a fractional domain. These techniques relating to waveforms based on modulation of signals in a fractional domain may be known by various names, such as frequency-modulated OFDM (FM-OFDM), linearly frequency-modulated OFDM (LFM-OFDM), fractional Fourier Transform (FrFT) modulation, fractional modulation (FrM), and the like. For simplicity and convenience, only "frequency-modulated OFDM" is primarily used herein.

The present inventors have realized that techniques for implementing frequency-modulated OFDM waveform signals may be performed at multiple stages of a signal generation chain and a signal detection chain. For example, in theory, in order to transform an input signal to a fractional domain for transmitting the modulated signal in a domain of the order of a, the input signal may be modulated with an inverse fractional Fourier transform (IFrFT) operator ($F_{-\alpha}$), and the received signal may be demodulated using the corresponding fractional Fourier transform (FrFT) operator ($F_{\alpha}$). In practice, the modulation operation $F_{-\alpha}$ may be conveniently performed on the signal over at least two stages, $F_{-\alpha}=F_{-1}F_{(1-\alpha)}=F_{-1}F_{-(\alpha-1)}$. Correspondingly, during signal detection and demodulation, the demodulation operation $F_{\alpha}$ may also be performed on the received signal in multiple stages represented by $F_{\alpha}=F_{(\alpha-1)}F$. Such multiple-stage modulation allows flexible manipulation of the signals to be transmitted or received, to address various practical issues encountered during signal generation, transmission, reception, and detection. As can be appreciated, the modulation operator $F_{-1}$ and demodulation operator F can be the same as those used in a conventional orthogonal frequency division multiplexing (OFDM) modulation/demodulation architecture. Thus, it is possible to conveniently utilize or adapt existing OFDM-based devices and technologies to perform frequency-modulated OFDM-based signal communication.

More specifically, an OFDM-based waveform signal incorporating frequency-modulated subcarriers can be generated according to a frequency modulation parameter corresponding to a frequency change rate of a frequency-modulated subcarrier. In this case, the OFDM-based waveform signal can be conveniently generated and communicated as signals modulated in a fractional domain. For example, modulated symbols may be generated from a sequence of bits, and are precoded according to the frequency modulation parameter to generate precoded symbols, and the precoded symbols may then be subjected to an OFDM-based modulation to generate the OFDM-based waveform signal. The OFDM-based waveform signal can then be output, transmitted, received, and decoded or demodulated. This approach can take at least some advantages of the benefits and conveniences provided by both fractional domain-based modulation and OFDM-based modulation of waveforms for wireless communication, and avoid or mitigate some of the drawbacks of a traditional OFDM modulation technique.

The existing communication networks and devices for communication based on OFDM modulation may be modified for communication of fractional modulated waveform signals described herein. Examples of existing technologies or waveforms based on OFDM modulation include cyclic prefix OFDM (CP-OFDM), Discrete Fourier Transform spread OFDM (DFT-s-OFDM), and filtered OFDM (f-OFDM). Suitable OFDM-based waveforms, such as the above examples and others, may be advantageously modified according to the embodiments described herein, in order to enable communication of frequency-modulated OFDM waveform signals.

Precoding as used herein may refer to any coding operation(s) or modulation(s) that transform a digital input signal into a frequency-modulated output signal. Precoding may be performed in different domains, and typically transform the input signal in a first domain to an output signal in a second, fractional domain. Precoding may include linear operations.

The above waveform signal may be beneficial for integrated sensing and communication because frequency-modulated OFDM can be flexible and can adapt to different user capabilities based on the desired or required communications and sensing performances. At the same, as will be further explained below, the specific frequency-modulated OFDM techniques described herein can also be implemented to avoid or limit certain deteriorations or degradations that render traditional OFDM ineffective and to avoid or limit the inter-carrier interference (ICI) caused by the loss of orthogonality between the bases of the traditional OFDM waveform.

In wireless communication networks, data are embedded into communication signals for transmission. Data embedding refers to a process of incorporating communications symbols into a waveform at the transmitter and extraction (a.k.a. estimation) of these symbols at the receiver. Some existing advanced communications systems embed communications symbols in the amplitudes of base functions that are orthonormal to each other. Two base functions are orthonormal when they are orthogonal to each other and have unit energy. In a discrete domain, where functions are represented by high-dimensional vectors, orthonormality of (vector) bases means that their projections onto each other is always zero (hence orthogonal) and they have $l_2$ norm that is equal to one (hence unit energy). When the orthogonality principle is maintained at the receiver, the symbol embedded onto one basis does not cause interference (a.k.a. projections) on any other bases in the communication signal.

In conventional OFDM, data symbols are embedded on the amplitude of pure tones, or harmonics, whose frequencies are chosen such that they form orthonormal bases. The orthogonality of OFDM bases at the receiver is maintained using cyclic prefix (CP) insertion. OFDM embeds data symbols in the frequency domain. A number (N) of symbols, $p_1 \ldots p_N$, may be embedded onto N orthonormal harmonic bases, $\exp(2\pi i n\Delta f t)$, $n=1 \ldots N$. At the transmitter, an OFDM signal S(u) can be generated by inverse Fourier Transform of the communication signal (symbols) s(u) in terms of harmonics of different frequencies. A Fourier transform (synthesis formula) can be applied to the OFDM signal to retrieve the communication signal (symbols) s(u) as shown below:

$$S(u) = \int s(u')e^{-2\pi i f u'}\,du'$$

$$s(u) = \int S(u')e^{2\pi i f u'}\,du'.$$

In theory, under certain assumptions or conditions, OFDM can potentially provide optimal performance for integrated sensing and communication. In practice, however, performance of integrated sensing and communication using OFDM will deteriorate when inter-carrier interference (ICI) is present. ICI can be caused by loss of orthogonality between the harmonics, also referred to as subcarriers. When an OFDM waveform passes through a communication channel and radio frequency (RF) frontends of transmit (TX) points and receive (RX) points, the apparent characteristics of the waveform can change due to a number of factors. As a result, the orthogonality between the subcarriers is lost, which can manifest in the form of multiplicative and additive degradations of the received waveform. It can be costly to deal with multiplicative errors, but it is possible to remove or reduce multiplicative errors through suitable tracking mechanisms. It is even more challenging and very difficult to remove or reduce the additive ICI errors, and such additive ICI errors, which can cause serious difficulties for both communications and sensing.

ICI may occur due to many different factors, which may be independent from one another. The possible factors include mismatch between oscillator signals generated at the TX or RX for synthetization or sampling and up-conversion or down-conversion tasks, respectively, phase noises of the phase-lock loop (PLL) at both TX and RX, imperfect mixing operations, insufficient or infrequent synchronization, channel time selectivity (Doppler Effect), and the like.

It is difficult to design an OFDM waveform for integrated sensing and communication because ICI negatively impacts on estimation of channel parameters, as opposed to estimation of the data. It is difficult to eliminate all root causes of ICI, even for mono-static sensing where the TX/RX operate using a single oscillator and there is no ICI caused by lack of synchronization. In practical implementations, there will always be some ICI, due to factors such as PLL or oscillator (OSC) phase noise, jitter, or the like. The effect of ICI can be highly magnified by inadequate cancellation of self-interference (SI) from the transmitter chain to the receiver chain, which will severely degrade sensing performance. The performance of OFDM is thus very sensitive to deviations from ideal conditions. For these and other reasons, the conventional OFDM technique does not provide a practical and suitable solution for integrated sensing and communication with either mono-static or bi-static configuration.

The present inventors have recognized that some of the drawbacks, including susceptibility of subcarriers to channel and hardware (HW) degradation of OFDM waveforms, may be avoided when using waveforms generated based on other base functions (a.k.a. kernels). The spectral content of a signal carries information on temporal change of the behavior of the signal. For instance, delay of a signal when propagating in a wireless communication environment is a temporal change that manifests as a phase shift in the frequency domain. The more spectral content the waveform contains, the more accurately and unambiguously the propagation delay can be estimated. For conventional OFDM, the harmonics contain limited spectral (frequency) content, so the only way to estimate the propagation delay is to coherently combine the received subcarriers to construct an illusionary wideband signal. Unfortunately, such coherent combining is highly susceptible to the degradations discussed above.

OFDM may be a suitable and practical waveform when ICI can be limited. ICI may be limited in, for example, always-on devices using high-grade RF frontends, where time/frequency synchronization parameters can be frequently and adequately tracked and compensated. In LTE or even 5G networks, OFDM may still provide adequate performance for communicating data where it is not necessary to provide integrated sensing and communication.

A frequency modulated continuous wave (FMCW) radar is based on transmission of very wideband chirps and processing the returned echoes. A chirp, or chirp function or chirp base, is a signal consisting of one frequency that linearly increases or decreases over time at a constant rate. It has been recognized that a chirp can provide a suitable performance for radar and sensing, due to its robustness to dispersions in time and frequency. However, it is not expected that transmitting a single chirp could simultaneously satisfy both sensing and communication requirements. For instance, increasing the duration of the chirp can increase sensing quality due to enhanced processing gain, but will at the same time decrease the rate of data communication if the data is embedded in the amplitude of the signal. Due to such conflicting effects, in the past, chirps have only been used in waveforms for sensing purposes (e.g., chirp spread spectrum) or for very low-rate communication purposes (e.g., the LoRa protocol).

Ultra-wideband (UWB) waveforms, also known as ultra-wide band or ultra-band waveforms can use low energy for short-range, high bandwidth communications and for sensing. However, UWB waveforms are not suitable or efficient for data communication or integrated sensing and communication over long ranges or in a limited bandwidth or when estimation of the Doppler shift or velocity of the user is involved.

Conventional or existing waveforms, such as OFDM with cyclic-prefix (CP-OFDM) or FMCW waveforms, have a limited or no flexibility for adapting to applications in different situations, such as different user capabilities and HW imperfections, based on the required communications and sensing performances.

As alluded to above, example frequency-modulated OFDM waveforms as described herein can provide improved performance for integrated sensing and communication.

To address one more of the drawbacks of OFDM, FMCW, and other types of conventional waveforms, in example embodiments of this disclosure, the frequency-modulated OFDM waveform is generated and detected based on modulating the communicated signal in a fractional domain.

In some embodiments described herein, waveforms are designed for simultaneous sensing (of position and velocity) and communication. In different embodiments, other design objectives may include reducing signal distortion due to imperfections such as HW imperfections and lack of synchronization, easy and convenient implementation, or abilities to reduce or remove signal interferences.

In some embodiments, a proposed approach for waveform design is to construct a waveform from high-level orthonormal bases that have acceptable time and frequency localization properties. With a high-level representation, data can be embedded onto orthonormal bases for communications and the orthonormal bases can be used individually, or collectively, to perform sensing at the same time.

In example embodiments, the modulation and precoding of data signals or data symbols include embedding data symbols in the fractional domain with chirp bases. In some cases, waveforms described herein may be used with a wide range of radars, and can be conveniently demodulated or decoded even if the communication channels or signal transmission encounters or involves hardware imperfections and a loss of orthogonality in the transmitted signals. In some embodiments, each individual chirp base can be used for time/frequency localization independently, as opposed to FT domain localization (e.g., as in OFDM) which depends on joint processing of harmonics to gain time-domain and frequency-domain resolution. The waveforms described here also allow efficient communication of data. For example, in waveforms communicated in the fractional domain, data can be embedded on orthonormal chirp bases.

Some example embodiments are described with references to the figures next.

Referring to FIG. 1, as an illustrative example without limitation, a simplified schematic illustration of a communication system 100 is provided. The communication system 100 comprises a radio access network 120. The radio access network 120 may be a next generation (e.g., sixth generation (6G) or later) radio access network, or a legacy (e.g., 5G, 4G, 3G or 2G) radio access network. One or more communication electronic device (ED) 110*a*-120*j* (generically referred to as 110) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. The communication system 100 may include a public switched telephone network (PSTN) 140, the internet 150, and one or more other networks 160.

Figure 2:
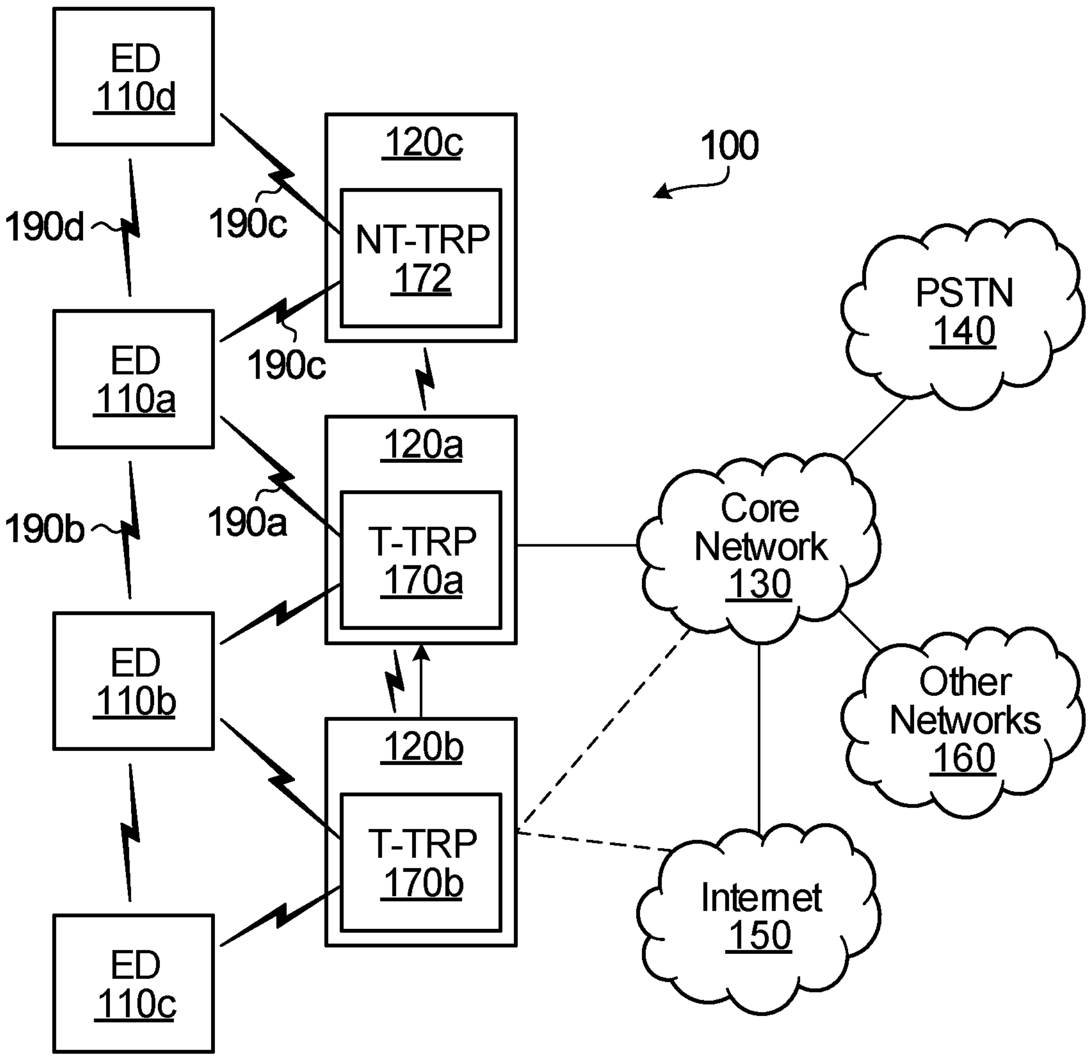
FIG. 2 is a schematic network diagram of an example embodiment of the communication system of FIG. 1.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 100 includes electronic devices (ED) 110*a*-110*d* (generically referred to as ED 110), radio access networks (RANs) 120*a*-120*b*, non-terrestrial communication network 120*c*, a core network 130, a public switched telephone network (PSTN) 140, the internet 150, and other networks 160. The RANs 120*a*-120*b* include respective base stations (BSs) 170*a*-170*b*, which may be generically referred to as terrestrial transmit and receive points (T-TRPs) 170*a*-170*b*. The non-terrestrial communication network 120*c* includes an access node 172, which may be generically referred to as a non-terrestrial transmit and receive point (NT-TRP) 172.

A terrestrial communication system may also be referred to as a land-based or ground-based communication system, although a terrestrial communication system can also, or instead, be implemented on or in water. The non-terrestrial communication system may bridge the coverage gaps for underserved areas by extending the coverage of cellular networks through non-terrestrial nodes, which will be key to ensuring global seamless coverage and providing mobile broadband services to unserved/underserved regions, in this case, it is hardly possible to implement terrestrial access-points/base-stations infrastructure in the areas like oceans, mountains, forests, or other remote areas.

The terrestrial communication system may be a wireless communications using 5G technology and/or later generation wireless technology (e.g., 6G or later). In some examples, the terrestrial communication system may also accommodate some legacy wireless technology (e.g., 3G or 4G wireless technology). The non-terrestrial communication system may be a communications using the satellite constellations like conventional Geo-Stationary Orbit (GEO) satellites which utilizing broadcast public/popular contents to a local server, Low earth orbit (LEO) satellites establishing a better balance between large coverage area and propagation path-loss/delay, stabilize satellites in very low earth orbits (VLEO) enabling technologies substantially reducing the costs for launching satellites to lower orbits, high altitude platforms (HAPs) providing a low path-loss air interface for the users with limited power budget, or Unmanned Aerial Vehicles (UAVs) (or unmanned aerial system (UAS)) achieving a dense deployment since their coverage can be limited to a local area, such as airborne, balloon, quadcopter, drones, etc. In some examples, GEO satellites, LEO satellites, UAVs, HAPs and VLEOs may be horizontal and two-dimensional. In some examples, UAVs, HAPs and VLEOs coupled to integrate satellite communications to cellular networks emerging 3D vertical networks consist of many moving (other than geostationary satellites) and high altitude access points such as UAVs, HAPs and VLEOs.

Further terrestrial and non-terrestrial networks can enable a new range of services and applications such as earth monitoring, remote sensing, passive sensing and positioning, navigation, and tracking, autonomous delivery and mobility. Terrestrial networks based sensing and non-terrestrial networks based sensing could provide intelligent context-aware networks to enhance the UE experience. For an example, terrestrial networks based sensing and non-terrestrial networks based sensing will involve opportunities for localization and sensing applications based on a new set of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further terrestrial and non-terrestrial networks, the measured channel data and sensing and positioning data can be obtained by the large bandwidth, new spectrum, dense network and more light-of-sight (LOS) links. Based on these data, a radio environmental map can be drawn through AI/ML methods, where channel information is linked to its corresponding positioning or environmental information to provide an enhanced physical layer design based on this map.

Sensing coordinators are nodes in a network that can assist in the sensing operation. These nodes can be stand-alone nodes dedicated to just sensing operations or other nodes (for example TRP 170, ED 110, or core network node) doing the sensing operations in parallel with communication transmissions. New protocol and signaling mechanisms are needed so that the corresponding interface link can be performed with customized parameters to meet particular requirements while minimizing signaling overhead and maximizing the whole system spectrum efficiency.

Any ED 110 may be alternatively or additionally configured to interface, access, or communicate with any other T-TRP 170*a*-170*b* and NT-TRP 172, the internet 150, the core network 130, the PSTN 140, the other networks 160, or any combination of the preceding. In some examples, ED 110*a* may communicate an uplink and/or downlink transmission over an interface 190*a* with T-TRP 170*a*. In some examples, the EDs 110*a*, 110*b* and 110*d* may also communicate directly with one another via one or more sidelink air interfaces 190*b*. In some examples, ED 110*d* may communicate an uplink and/or downlink transmission over an interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190*a* and 190*b*. The communication system 100 may also implement a channel access method based on the aforementioned frequency-modulated OFDM waveform, as will be further described below. The air interfaces 190*a* and 190*b* may utilize other higher dimension signal spaces, which may involve a combination of orthogonal and/or non-orthogonal dimensions.

The air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120*a* and 120*b* are in communication with the core network 130 to provide the EDs 110*a* 110*b*, and 110*c* with various services such as voice, data, and other services. The RANs 120*a* and 120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a* and 120*b* or EDs 110*a* 110*b*, and 110*c* or both, and (ii) other networks (such as the PSTN 140, the internet 150, and the other networks 160). In addition, some or all of the EDs 110*a* 110*b*, and 110*c* may include functionality for communicating with different wireless networks over different wireless links using different wireless technologies and/or protocols. Instead of wireless communication (or in addition thereto), the EDs 110*a* 110*b*, and 110*c* may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110*a* 110*b*, and 110*c* may be multimode devices capable of operation according to multiple radio access technologies, and incorporate multiple transceivers necessary to support such.

Figure 3:
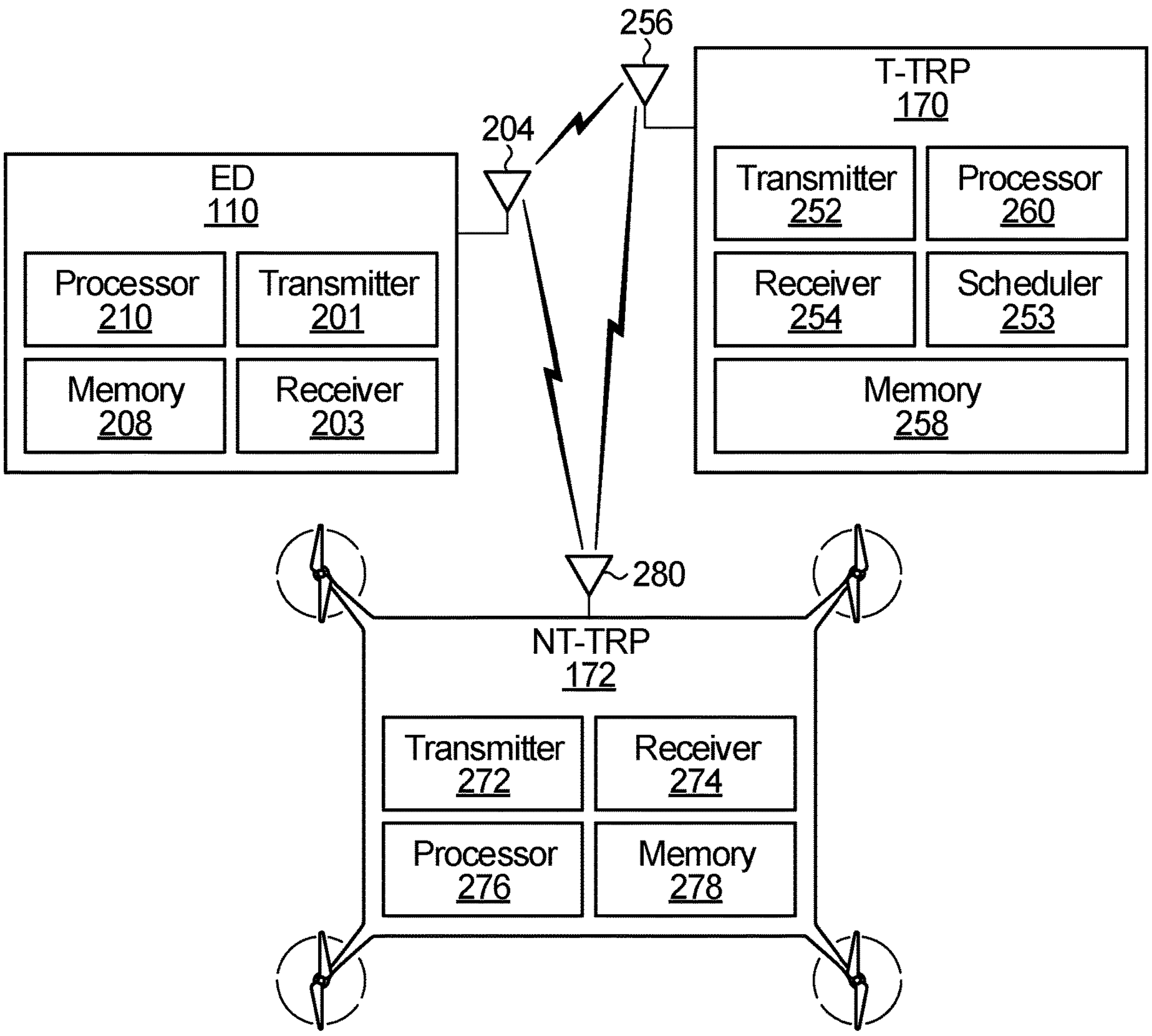
FIG. 3 is a block diagram of an example electronic device (ED) and transmit and receive points (TRP)

FIG. 3 illustrates another example of an ED 110, a T-TRP 170, and a NT-TRP 172.

The ED 110 is used to connect persons, objects, or machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery, and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms.

Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated in FIG. 3. One, some, or all of the antennas may alternatively be panels. The transmitter 201 and the receiver 203 may be integrated, e.g., as a transceiver. The transceiver is configured to modulate data or other content for transmission by at least one antenna 204 or network interface controller (NIC). The transceiver is also configured to demodulate data or other content received by the at least one antenna 204. In particular, the transceiver is configured to perform fractional domain modulation and demodulation of the transmitted or received signals, as will be further described below. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, those related to processing sidelink transmission to and from another ED 110, and those related to sensing. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g., by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g., beam angle information (BAI), received from T-TRP 170. In some embodiments, the processor 210 may perform operations relating to network access (e.g., initial access) and/or downlink synchronization, such as operations relating to detecting a synchronization sequence, decoding and obtaining the system information, etc. In some embodiments, the processor 210 may perform channel estimation, e.g., using a reference signal received from the NT-TRP 172 and/or T-TRP 170.

Operations related to sensing may include transmission of a sensing signal, receiving the sensing signal, processing the sensing signal to obtain information about the environment and sharing this information or a subset of the information with other nodes.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g., in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g., communication module, modem, or chip) in the forgoing devices.

The T-TRP 170 may be a base station, such as BS 170*a*, BS 170*b*, or BS 170*c*.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g., through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g., MIMO precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g., initial access) and/or downlink synchronization, such as generating the content of synchronization signal blocks (SSBs), generating the system information, etc. In some embodiments, the processor 260 also generates the indication of beam direction, e.g., BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g., to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g., a physical downlink control channel (PDCCH), and static or semi-static higher layer signaling may be included in a packet transmitted in a data channel, e.g., in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g., in memory 258. Alternatively, some or all of the processor 260, the scheduler 253, and the processing components of the transmitter 252 and receiver 254 may be implemented using dedicated circuitry, such as a FPGA, a GPU, or an ASIC.

The NT-TRP 172 in FIG. 3 may be any NT-TRP, such as a drone as illustrated in FIG. 3. Although the NT-TRP 172 is illustrated as a drone as an example, the NT-TRP 172 may be implemented in any suitable non-terrestrial form. The NT-TRP 172 may also be known by other names in some implementations, such as a non-terrestrial node, a non-terrestrial network device, or a non-terrestrial base station.

The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g., MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g., BAI) received from T-TRP 170. In some embodiments, the processor 276 may generate signaling, e.g., to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g., in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g., through coordinated multipoint transmissions.

The T-TRP 170, the NT-TRP 172, and/or the ED 110 may include other components, but these have been omitted for the sake of clarity.

Figure 4:
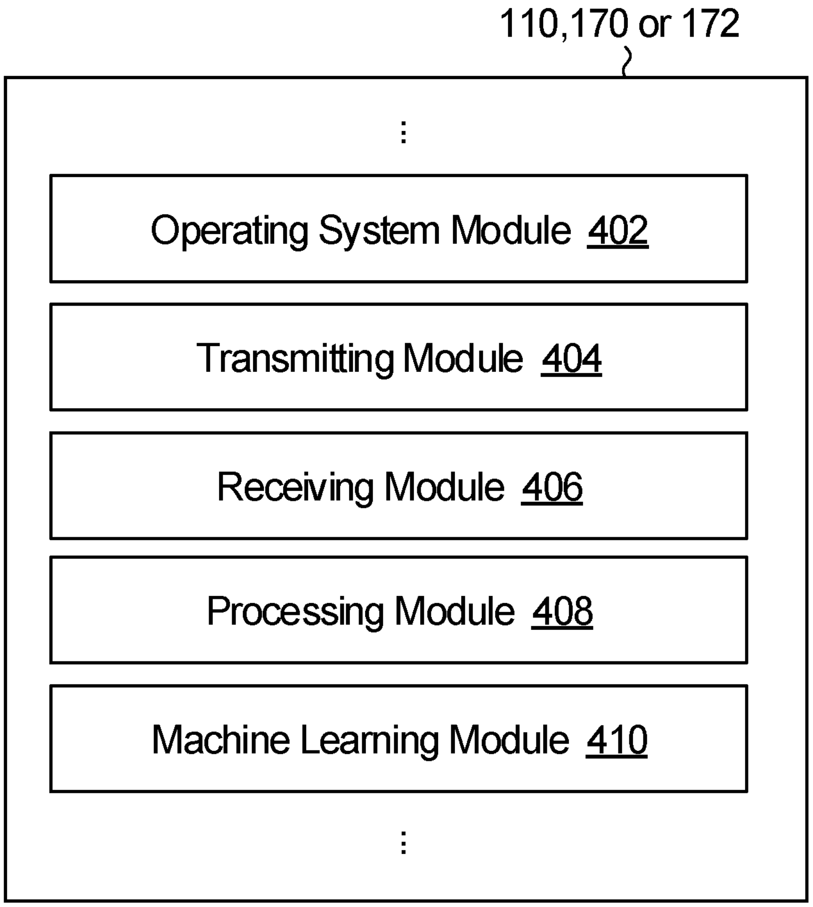
FIG. 4 is a block diagram of example component modules.

One or more steps of the embodiment methods provided herein may be performed by corresponding units or modules, such as according to FIG. 4. FIG. 4 illustrates units or modules in a device, such as in ED 110, in T-TRP 170, or in NT-TRP 172. For example, the device may include an operating system unit or module 402. A signal may be transmitted by a transmitting unit or a transmitting module 404. A signal may be received by a receiving unit or a receiving module 406. A signal may be processed by a processing unit or a processing module 408. Other steps may be performed by an artificial intelligence (AI) or machine learning (ML) module 410. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

An air interface generally includes a number of components and associated parameters that collectively specify how a transmission is to be sent and/or received over a wireless communications link between two or more communicating devices. For example, an air interface may include one or more components defining the waveform(s), frame structure(s), multiple access scheme(s), protocol(s), coding scheme(s) and/or modulation scheme(s) for conveying information (e.g., data) over a wireless communications link. The wireless communications link may support a link between a radio access network and user equipment (e.g., a "Uu" link), and/or the wireless communications link may support a link between device and device, such as between two user equipments (e.g., a "sidelink"), and/or the wireless communications link may support a link between a non-terrestrial (NT)-communication network and user equipment (UE).

The following are some examples of the above components:

A waveform component may specify a shape and form of a signal being transmitted. Waveform options may include orthogonal multiple access waveforms and non-orthogonal multiple access waveforms. The waveforms include frequency-modulated OFDM waveforms as disclosed herein. More details of the frequency-modulated OFDM waveform will be discussed below. Non-limiting examples of other waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF).

A frame structure component may specify a configuration of a frame or group of frames. The frame structure component may indicate one or more of a time, frequency, pilot signature, code, or other parameter of the frame or group of frames. More details of frame structure will be discussed below.

A multiple access scheme component may specify multiple access technique options, including technologies defining how communicating devices share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, multiple access technique options may include: scheduled access vs. non-scheduled access, also known as grant-free access; non-orthogonal multiple access vs. orthogonal multiple access, e.g., via a dedicated channel resource (e.g., no sharing between multiple communicating devices); contention-based shared channel resources vs. non-contention-based shared channel resources, and cognitive radio-based access.

A hybrid automatic repeat request (HARQ) protocol component may specify how a transmission and/or a re-transmission is to be made. Non-limiting examples of transmission and/or re-transmission mechanism options include those that specify a scheduled data pipe size, a signaling mechanism for transmission and/or re-transmission, and a re-transmission mechanism.

A coding and modulation component may specify how information being transmitted may be encoded/decoded and modulated/demodulated for transmission/reception purposes. Coding (also known as channel coding) may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low PAPR modulation.

In some embodiments, the air interface may be a "one-size-fits-all concept". For example, the components within the air interface cannot be changed or adapted once the air interface is defined. In some implementations, only limited parameters or modes of an air interface, such as a cyclic prefix (CP) length or a multiple input multiple output (MIMO) mode, can be configured. In some embodiments, an air interface design may provide a unified or flexible framework to support below 6 GHz and beyond 6 GHz frequency (e.g., mmWave) bands for both licensed and unlicensed access. As an example, flexibility of a configurable air interface provided by a scalable numerology and symbol duration may allow for transmission parameter optimization for different spectrum bands and for different services/devices. As another example, a unified air interface may be self-contained in a frequency domain, and a frequency domain self-contained design may support more flexible radio access network (RAN) slicing through channel resource sharing between different services in both frequency and time.

A frame structure is a feature of the wireless communication physical layer that defines a time domain signal transmission structure, e.g., to allow for timing reference and timing alignment of basic time domain transmission units. A frame essentially includes one or more information carrying elements, typically known as a symbol. The frame structure defines time domain parameters to enable correct transmission and reception of information in these symbols. Wireless communication between communicating devices may occur on time-frequency resources governed by a frame structure. The frame structure may sometimes instead be called a radio frame structure.

Depending upon the frame structure and/or configuration of frames in the frame structure, frequency division duplex (FDD) and/or time-division duplex (TDD) and/or full duplex (FD) communication may be possible. FDD communication is when transmissions in different directions (e.g., uplink vs. downlink) occur in different frequency bands. TDD communication is when transmissions in different directions (e.g., uplink vs. downlink) occur over different time durations. FD communication is when transmission and reception occurs on the same time-frequency resource, i.e., a device can both transmit and receive on the same frequency resource concurrently in time.

The frame structures may have varying flexibilities in different embodiments. For example, a frame structure may be defined by different parameters, each of which may be fixed or configurable. Examples of frame structure parameters include frame length, subframe length, slot length, symbol length, number of subframes per frame, number of symbols per frame, etc.

Figure 5A:
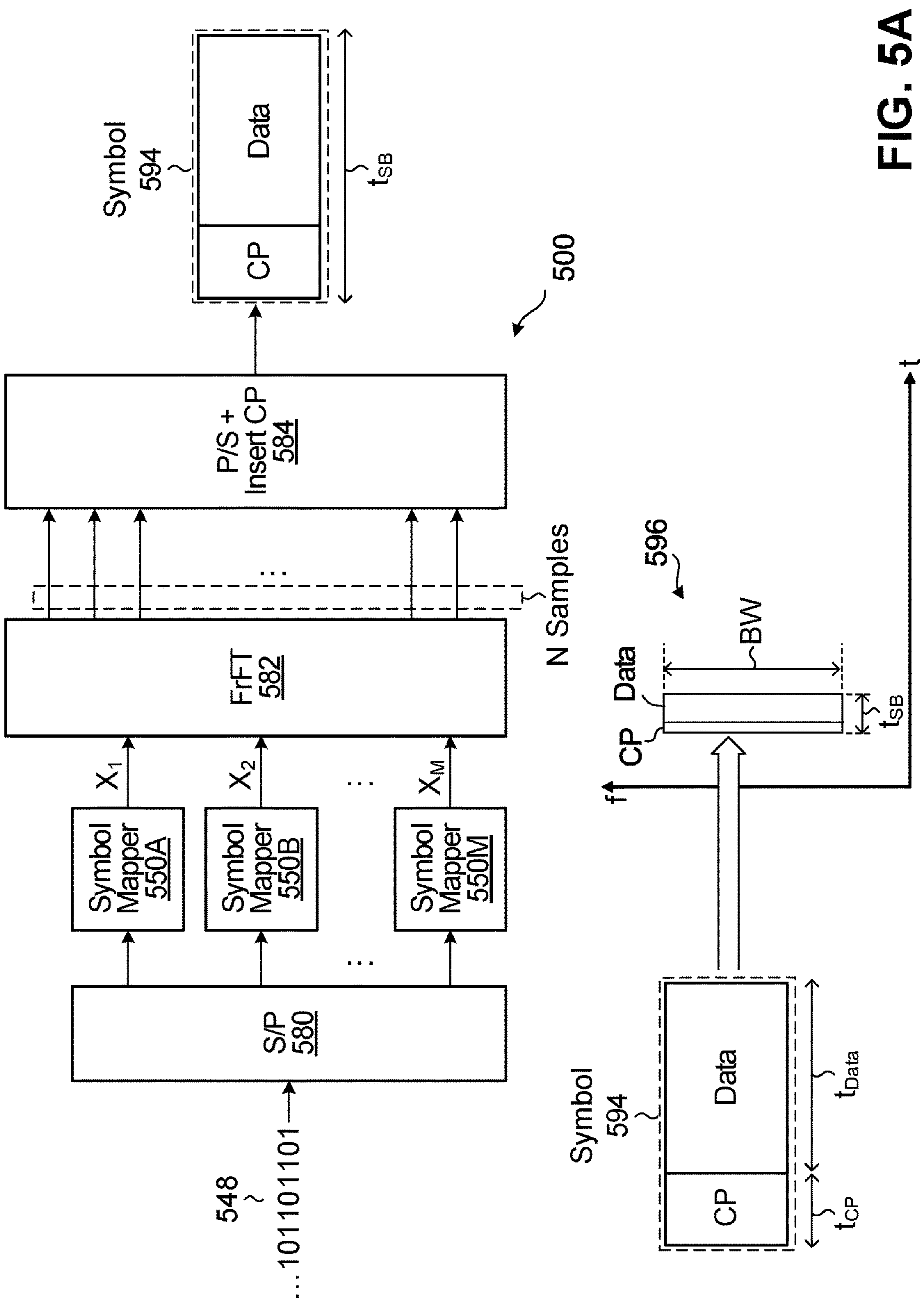
FIG. 5A illustrates generation of a frequency-modulated OFDM symbol.

FIG. 5A illustrates generation of a frequency-modulated OFDM waveform signal, according to an embodiment. In the example illustrated in FIG. 5A, a plurality of bits 548 is obtained by an apparatus 500, which may be a transmitter or in a transmit chain (not shown), such as transmitter 201, 252, or 272 in an ED 110 or a TRP 170. Optionally, the plurality of bits 548 may undergo serial-to-parallel conversion in serial-to-parallel (S/P) convertor 580 to generate M parallel bit streams, where M is a natural number greater than one. Alternatively, the bits 548 may be directly input as parallel bit streams. Each parallel bit stream may be mapped by a respective symbol mapper 550A-M to generate M data symbols $X_1$ to $X_M$, which are also referred to as modulated symbols. Each symbol mapper 550A-M may be implemented by a bit-to-symbol modulator (e.g., by a processor 210, 260, or 276, or a module/unit/circuitry). One example type of modulation that may be implemented by one or more of the symbol mappers 550A-M is quadrature amplitude modulation (QAM), in which case the resulting data symbol is a QAM symbol that carries two or more bits, depending upon the constellation order. Other examples of modulation include binary phase shift keying (BPSK), $$\frac{\pi}{2} - BPSK,$$

and quadrature phase shift keying (QPSK).

Each modulated symbol $X_1$ to $X_M$ is for transmission on a respective different subcarrier, which is frequency-modulated with a specified frequency change rate, and the subcarriers may have a particular subcarrier spacing as will be described below. Accordingly, the modulated symbols $X_1$ to $X_M$ undergo a suitable FrFT modulation 582 as discussed elsewhere herein to generate N time-domain sample outputs, where N is a natural number, typically greater than or equal to M. The resulting symbols after operation 582 are frequency-modulated symbols and the FrFT modulation 582 is based on a frequency modulation parameter, such as a fractional domain order, that corresponds to a frequency change rate of the frequency-modulated subcarriers. The FrFT modulation 582 may, in some embodiments, include a precoding operation as described in greater detail below.

The frequency-modulated symbols next undergo parallel-to-serial conversion and CP insertion operation 584. Each of the operations 582 and 584 may be implemented by a modulator or a processor, e.g., by a processor 210, 260 or 276, or a module/unit/circuitry in any of the devices described herein, including a processor chip such as a baseband processor.

Each frequency-modulated OFDM symbol 594 generated by apparatus 500 includes a redundancy (e.g., CP) portion and a data portion. The CP portion has a duration $t_{CP}$ (also called CP length) and the data portion has a duration $t_{Data}$, and the total duration of the symbol 594 is $t_{SB}=t_{CP}+t_{Data}$. The CP portion may be a repetition of some of the data portion, e.g., a repeat of the data portion present at the end of the symbol 594, or may be different from the end portion of the symbol 594 as will be discussed elsewhere according to an embodiment disclosed herein. The CP portion may be present at the start of the symbol 594, as illustrated. The data portion of the frequency-modulated OFDM symbol 594 may transmit the data symbols $X_1$ to $X_M$ all in parallel on M different subcarriers having a particular subcarrier spacing. The frequency-modulated OFDM symbol 594 is transmitted over a particular bandwidth (or partial bandwidth, bandwidth partition, bandwidth part, sub-band, etc.), as shown at 596. The bandwidth is dependent upon the subcarrier spacing and the number of subcarriers used, which may occupy part of a designated bandwidth (or bandwidth partition, sub-band, etc.). The frequency-modulated OFDM symbol 594 may be transmitted in the uplink, the downlink, or a sidelink. The components illustrated and operations described in relation to FIG. 5A may be implemented by processor 210 if the symbol 594 is an uplink or sidelink transmission sent by an ED 110, or may be implemented by processor 260 or 276 if the symbol 594 is a downlink transmission sent by a TRP such as a T-TRP 170 or a NT-TRP 172.

In FIG. 5A, the symbol 594 is multi-carrier (or equivalently multi-subcarrier), in that a multi-carrier/multi-subcarrier waveform is used. The CP and data symbols are transmitted on multiple subcarriers, with the data symbols being transmitted in parallel on the multiple subcarriers during the data duration $t_{Data}$.

One example of a multi-carrier symbol is an OFDM symbol. For a conventional OFDM symbol or subcarrier, the modulation frequency does not change over time. However, for frequency-modulated subcarriers or symbols 594 after the FrFT modulation as illustrated in FIG. 5A, each subcarrier frequency changes over time at the frequency change rate corresponding to a frequency modulation parameter. Thus, the apparatus performing the FrFT operation 582 needs to obtain the frequency modulation parameter, which may be stored, determined, derived, or received from another device or location. The FrFT modulation 582 may include multiple modulation stages such as a precoding stage and an OFDM stage as described elsewhere herein.

The CP length may be communicated to an ED or TRP for one or more frequency-modulated OFDM symbols scheduled in a communication channel. For example, the CP length may be signaled by a base station dynamically, e.g., in downlink control information (DCI) when scheduling that symbol. The CP length may be signaled by the base station semi-statically, e.g., in radio resource control (RRC) signaling or in the medium access control (MAC) layer. For example, the CP length may remain constant for several frames, subframes, or slots, and when the CP length is changed it may be done so via RRC signaling or MAC layer information. The CP length may be predefined based on the application scenario, e.g., CP length is predefined as being a one particular length for certain application scenarios and another particular length for other application scenarios. In some embodiments, the ED may know the CP length based on the application scenario and the CP length might therefore not need to even be explicitly communicated to the ED. The CP length may be a function of channel conditions, in which case the CP length may not need to be explicitly communicated to the ED, e.g., if the ED and the base station are both able to determine (or be informed of) the channel conditions and if there is a predefined mapping between different channel conditions and different CP lengths. The CP length may be determined by the ED as a function of other parameters that are known by the ED. Alternatively, the CP length may be fixed, e.g., by a standard.

Figure 5B:
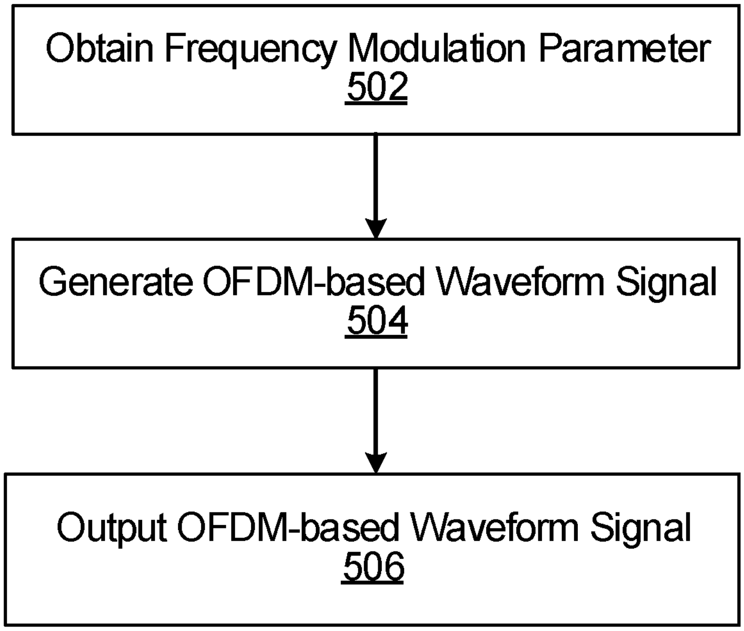
FIGS. 5B and 5C are block diagrams illustrating example frequency-modulated OFDM processes performed by an apparatus, according to various embodiments.
Figure 5C:
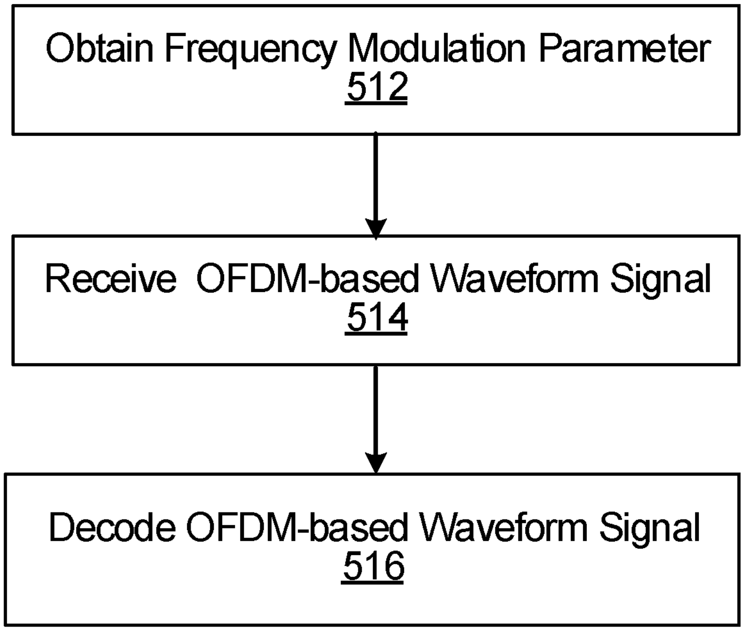

Each of FIGS. 5B and 5C illustrates an example process that may be performed in an apparatus, which may be any component, unit, module, circuitry, or processor described above.

As illustrated in FIG. 5B, an apparatus may be configured to obtain a frequency modulation parameter as described elsewhere herein at block 502, generate an OFDM-based waveform signal according to the frequency modulation parameter at block 504, and output the OFDM-based waveform signal at block 506. The apparatus may be a processor 210, 260, 276, or a component, unit or module in ED 110 or TRP 170, 172. The apparatus may be a processor or a component in a transmitter, or in a baseband processor chip.

The frequency modulation parameter corresponds to a frequency change rate of a frequency-modulated subcarrier. The OFDM-based waveform signal includes frequency-modulated subcarriers, which are modulated according to the frequency modulation parameter, resulting in a frequency-modulated OFDM waveform signal. For example, the apparatus may be further configured to generate modulated symbols from a sequence of bits and precode the modulated symbols, according to the frequency modulation parameter, to generate precoded symbols as described in the present disclosure. The apparatus can then generate the OFDM-based waveform signal from the plurality of precoded symbols. The apparatus may be further configured to interleave the modulated symbols or precoded symbols with pilot symbols. The apparatus may be configured to precode the modulated symbols by multiplying the modulated symbols with a chirp function selected according to the frequency change rate or a corresponding fractional order.

As illustrated in FIG. 5C, an apparatus may be configured to obtain the frequency modulation parameter at block 512, receive the OFDM-based waveform signal at block 514, and decode the OFDM-based waveform signal at block 506. The apparatus may be a processor 210, 260, 276, or a component, unit or module in ED 110 or TRP 170, 172. The apparatus may be a processor or a component in a receiver.

The frequency modulation parameter may be used to indicate how the waveform is modulated in a fractional domain. For example, an example of a frequency modulation parameter is the order (a) of the fractional domain, referred to as the fractional order herein. The fractional order $\alpha$ corresponds to a frequency change rate of a signal, such as a frequency-modulated subcarrier. A frequency-modulated subcarrier may be represented by a chirp function, and the frequency change rate may be the slope of the chirp function, also referred to as the chirp slope. Given the frequency modulation parameter such as fractional order $\alpha$, the signal processing device, which may be at a TX or RX node, will be able to determine the corresponding chirp slope, and modulate or demodulate the signal to be transmitted or being received in corresponding fractional domains accordingly. The same fractional order may be used for multiple subcarriers in a signal carrier (or multiple sub-channels in a communication channel). In some cases, multiple fractional orders corresponding to different frequency change rates may be selected and used for fractional modulation of symbols from the same user or of multiplex symbols from multiple users within the same symbol interval.

A device, such as a base station, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g., the center or lowest or highest frequency of the carrier. A carrier may be on licensed or unlicensed spectrum. Wireless communication with the device may also or instead occur over one or more bandwidth parts (BWPs), also known as sub-bands. For example, a carrier may have one or more BWPs or sub-bands. More generally, wireless communication with the device may occur over spectrum. The spectrum may comprise one or more carriers and/or one or more BWPs.

A cell may include one or multiple downlink resources and optionally one or multiple uplink resources, or a cell may include one or multiple uplink resources and optionally one or multiple downlink resources, or a cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may instead or additionally include one or multiple sidelink resources, including sidelink transmitting and receiving resources.

A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

In some embodiments, a carrier may have one or more BWPs, e.g., a carrier may have a bandwidth of 20 MHz and consist of one BWP, or a carrier may have a bandwidth of 80 MHz and consist of two adjacent contiguous BWPs, etc. In other embodiments, a BWP may have one or more carriers, e.g., a BWP may have a bandwidth of 40 MHz and consists of two adjacent contiguous carriers, where each carrier has a bandwidth of 20 MHz. In some embodiments, a BWP may comprise non-contiguous spectrum resources which consists of non-contiguous multiple carriers, where the first carrier of the non-contiguous multiple carriers may be in mmW band, the second carrier may be in a low band (such as 2 GHz band), the third carrier (if it exists) may be in THz band, and the fourth carrier (if it exists) may be in visible light band. Resources in one carrier which belong to the BWP may be contiguous or non-contiguous. In some embodiments, a BWP has non-contiguous spectrum resources on one carrier.

Wireless communication may occur over an occupied bandwidth. The occupied bandwidth may be defined as the width of a frequency band such that, below the lower and above the upper frequency limits, the mean powers emitted are each equal to a specified percentage of the total mean transmitted power.

The carrier, the BWP, or the occupied bandwidth may be signaled by a network device (e.g., base station) dynamically, e.g., in physical layer control signaling such as DCI, or semi-statically, e.g., in radio resource control (RRC) signaling or in the medium access control (MAC) layer, or be predefined based on the application scenario; or be determined by the UE as a function of other parameters that are known by the UE, or may be fixed, e.g. by a standard.

In some embodiments, a frequency bandwidth parameter defining one or more BWPs is signaled by a network device. The frequency bandwidth parameter indicates a frequency bandwidth associated with the plurality of frequency-modulated subcarriers. That is, the frequency bandwidth parameter indicates which subcarriers of the entire carrier bandwidth are to be used for communication of the frequency-modulated OFDM waveform signal. Accordingly, the carrier bandwidth may be partitioned to communicate the frequency-modulated OFDM waveform signal in certain frequency partitions, and communicate a conventional OFDM waveform signal in other frequency partitions, improving the flexibility of the overall network system.

Embodiments of the present disclosure advantageously facilitate support of both the frequency-modulated OFDM waveform and the conventional OFDM waveform in one cell or carrier. Implementation of fractional domain modulation over multiple stages, such as over a precoding stage and an OFDM stage, enables the frequency-modulated OFDM waveform generating and detecting apparatuses to be compatible with the conventional OFDM waveform.

As noted above, a common waveform used in the existing communication systems is the OFDM waveform optionally with cyclic-prefix (CP), which has certain drawbacks, particularly when used for integrated sensing and communication as discussed above.

Thus, in embodiments disclosed herein, frequency-modulated OFDM waveforms are used for integrated sensing and communication and the waveforms are structured and processed to reduce or remove ICI.

As can be understood by those skilled in the art, a signal (s(t)) in the time domain may be represented by an ordinary inverse Fourier Transform (IFT) of the signal with harmonic functions as the bases (or kernels) in the frequency domain. The same signal may also be represented by a transform of the signal with chirp functions as the bases (kernels), which is referred to as Fractional Fourier Transform (FrFT) in the fractional domain herein.

The FrFT of a signal s(u) may be given by $$s_\alpha(u) = \int s(u')K_\alpha(u, u')du' \qquad (1\text{-}1)$$

$$s(u) = \int s_\alpha(u')K_\alpha^*(u, u')du',$$

where kernels $k_\alpha$(u, u') are chirp functions (also referred to as chirp bases) from the fractional domain a as given by:

$$K_\alpha(u, u') = Z_\phi \exp\left(2\pi i\left(\frac{u^2 + u'^2}{2}\cot\phi - uu'\csc\phi\right)\right) \qquad (1\text{-}2)$$

$$\phi = \frac{\pi}{2}\alpha,\ Z_\phi = \sqrt{1 - i\cot\phi}.$$

The parameter α is referred to as the fractional order herein and may vary from −2 to 2.

When α=0, $K_\alpha$(u, u')=δ(u−u'), the FrFT maps a signal to itself; when α=1, $K_\alpha$(u, u')=exp(−2πiuu'), the transformation is just normal FT and the kernels are FT kernels; when α=0, $K_\alpha$(u, u')=δ(u+u'), the kernel is a parity operator; when α=−1, $K_\alpha$(u, u')=exp(2πiuu'), the kernels are inverse FT bases and the transformation is a normal IFT. When α has a fractional value, $K_\alpha$(u, u') is a chirp function spanning a bandwidth (BW) from a starting frequency ($f_0$) for a duration with a sweeping rate dependent on the value of α.

Similar to the normal FT, when the kernel spans infinitely in time, kernels $K_\alpha$(u, u') and $K_\alpha$(u, u") are orthogonal to each other, ∀u'≠u".

Assuming symbols denoted by $p_m$ are to be transmitted, a waveform s(u) for transmitting the symbols $p_m$ may be constructed as:

$$s(u) = \sum_{m=1}^{M} p_m \delta(u - m\Delta u), \qquad (1\text{-}3)$$

where δ(•) represents the Dirac delta function and u represents the domain of representation. Domain u is a generalized notion, and can be the time domain (u=t), frequency domain (u=f), or a mixed time and frequency (fractional) domain. It is apparent that, for a given frame length, the smaller the value of Au, the higher the number of data symbols (denoted by M) transmittable within a single frame. For kernels with an infinite length, Δu can be infinitely small and s(u) can become a continuous function with infinite degrees of freedom. However, in practice, the temporal span of the chirp kernels can only have a limited length, because the time for transmitting each frame (denoted as T) is limited. It is impractical to have kernels of an infinite length. The value of T may be selected based on the rate of traffic generation at the transmitter and the tolerance of the traffic to delay. For truncated kernels of duration T, a minimum separation Δu=u'−u"=sin $\phi T^{-1}$ is required to ensure that the kernels (also referred to as sub-channels or subcarriers) $K_\alpha$(u, u') and $K_\alpha$(u, u") from the same fractional domain remain orthogonal to each other. Combining (1-1), (1-2), and (1-3) yields:

$$s_\alpha(u) = \sum_{m=1}^{M} p_m K_\alpha(u, m\Delta u) \quad 0 \le u \le T,\quad \Delta u = \sin\phi T^{-1}. \qquad (1\text{-}4)$$

The waveform represented by s a is referred to as a frequency-modulated OFDM waveform herein, but the waveform s a may also be known by other names, such as fractional modulation waveform, fractional Fourier Transform waveform, and the like.

Figure 6A:
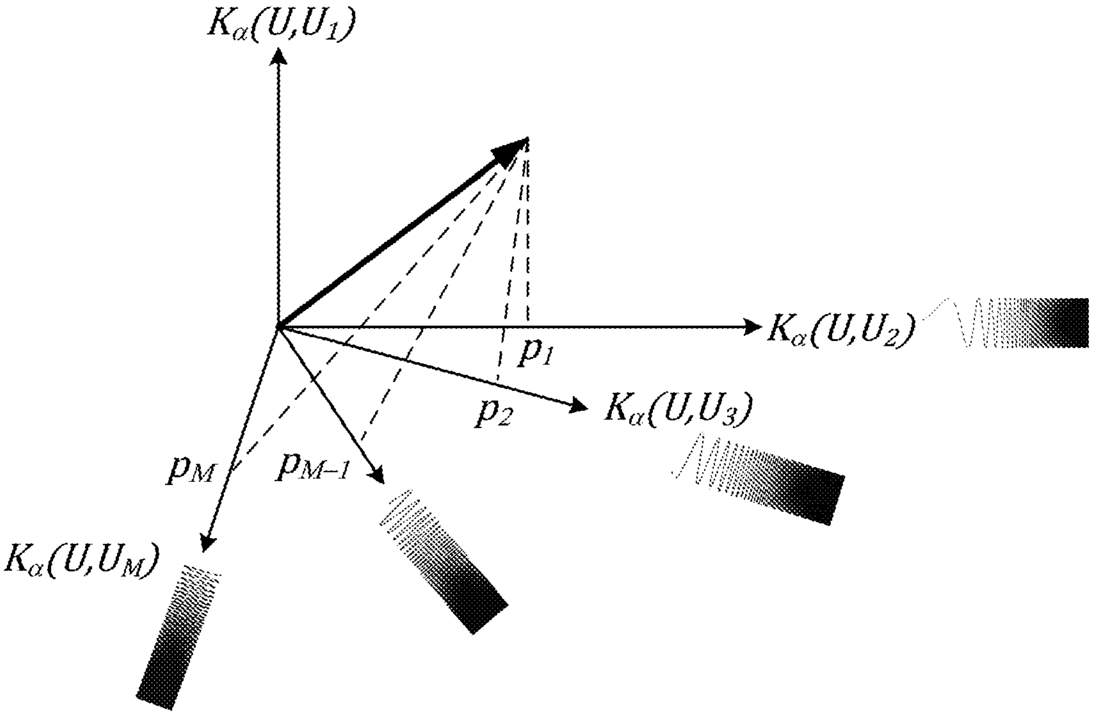
FIG. 6A is a schematic diagram illustrating representation of a signal or symbol in a fractional domain with chirp functions.

FIG. 6A is a vector-space representation of the frequency-modulated OFDM waveform $s_\alpha$(u) and its chirp functions $K_\alpha$(U, $U_m$) in the fractional domain with a fractional order α. The different chirp functions may have different frequencies at a given time but they have the same frequency change rate corresponding to the fractional order α as can be seen from Equation (1-2). For original signals in the time domain, U=t, and $K_\alpha$(U, $U_m$) reduces to $K_\alpha$(t, $U_m$).

Figure 6B:
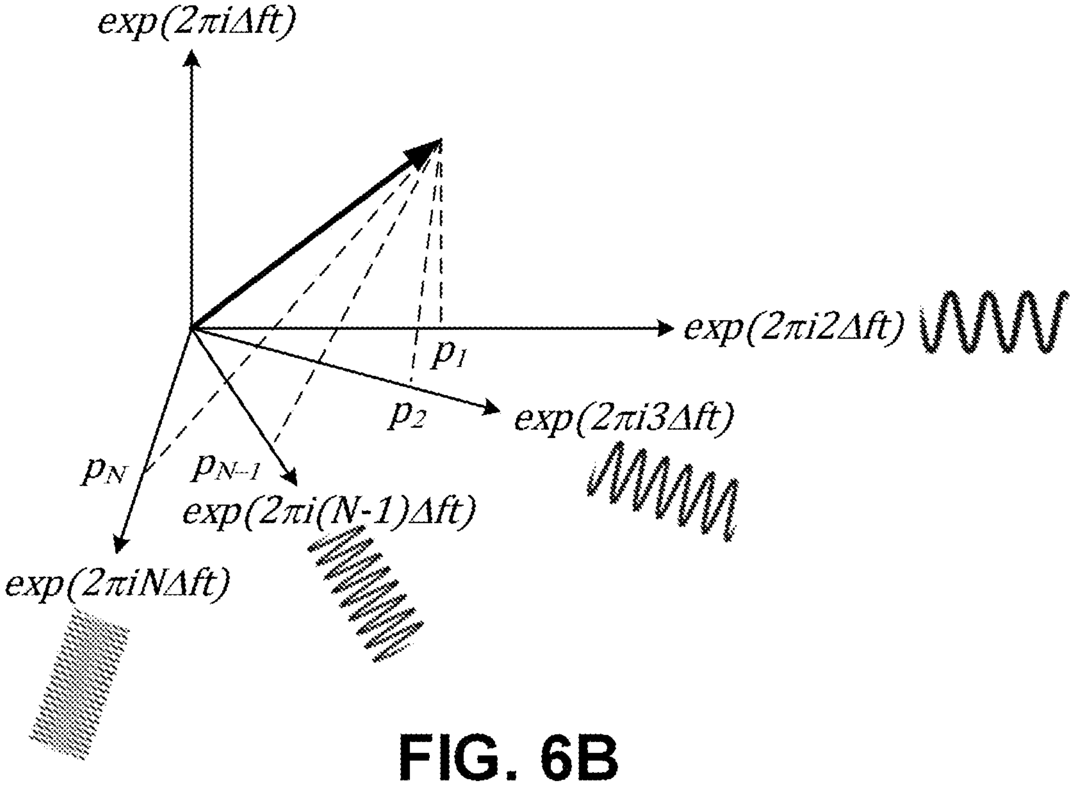
FIG. 6B is a schematic diagram illustrating representation of a signal or symbol in the frequency domain with single-tone frequencies.

For comparison, the representation of a time domain signal s(t) in the frequency domain is shown in FIG. 6B.

In different embodiments of the present disclosure, different approaches are proposed for addressing the effects of ICI in frequency-modulated OFDM waveforms.

One approach is to insert guard intervals between the symbols to maintain the orthogonality among the chirp functions (bases) of the fractional modulation waveform. This approach can simplify the equalization step during demodulation of the waveform at the receiving point, such that the level of complexity of signal processing is similar to that for OFDM waveforms. That is, N simple multiplications would be sufficient to remove ICI for detecting N symbols.

Another approach is to use a correlator at the receiving point to correctly detect the beginning of each frequency-modulated OFDM symbol based on reference signals (RSs). Any drift (often caused by insufficient time synchronization) from the ideal boundary between the symbols may be tracked by transmitting tracking RSs densely spread in time and frequency. Once the correct boundary is known, any propagation delay during transmission can be corrected and the signal may be subsequently processed as if there was no delay. This approach, however, is not an ideal solution for many reasons. For example, accurate determination of the symbol boundary requires transmission of wideband RSs and transmission of wideband tracking RSs. Such transmission not only results in inefficient usage of resources but may also be impossible for communication among electronic devices with diverse capabilities. Further, in a typical multipath channel, finding the exact boundary of the strongest received waveform still would not remove ICI resulted from projection of bases of less prominent (yet significant) multipath returns onto the desired bases. It is possible to use a multibank receiver, similar to the rake receiver in code division multiple access (CDMA) systems, but multibank receivers are costly and not suitable for large scale usage.

A further approach is to allow ICI to be present in the signal in the early stages of signal detection, and remove the ICI at the equalization stage by simultaneously equalizing the signal and eliminating the projections of non-orthogonal bases onto on each other through the transmission of demodulation RSs. In this approach, $N^2$ demodulating RSs are needed to detect N symbols of a single frequency-modulated OFDM waveform. This approach would not have been efficient if consecutive symbols cannot overlap, as is in the case of conventional OFDM. However, as will be further discussed below, the use of chirp bases in frequency-modulated OFDM allows consecutive frequency-modulated OFDM symbols to highly overlap. With such overlap, when the coherence time of the communication channel is not very short (as is the case for high velocity users), only one equalization step is needed to transmit multiple frequency-modulated OFDM symbols. As such, efficient data transmission may still be achieved even with the extra overhead for transmission of $N^2$ demodulating RSs.

In an embodiment of the present disclosure, suitable guard intervals with selected structures are used to generate frequency-modulated OFDM waveforms. Assuming a data signal of a frequency-modulated OFDM waveform in the fractional domain u is represented by $s_\alpha(u)$ as given in Equation (1-4), a waveform transmitted over a wireless channel, $s_\alpha(u)$, may be represented by:

$$\hat{s}_\alpha(u) = f\left(\sum_{m=1}^{M} p_m K_\alpha(u, m\Delta u)\right),\ -T_g \le u \le T \tag{1-5}$$

where f( ) is a function of the waveform $s_\alpha(u)$, and $T_g$ is the duration of the guard interval. As will be described further below, this transformation may be implemented such that the inserted guard interval is not necessarily cyclic and the transformed signal can be detected free of ICI.

Embedding data in a fractional domain, which is neither the time domain nor the frequency domain, is referred to herein as fractional modulation.

The waveform $s_\alpha(u)$ as represented in Equation (1-5) can be transmitted over a multipath channel with the channel impulse response (CIR) given by Equation (1-6):

$$h(t) = \sum_{j=1}^{N_{mp}} \beta_j \exp(-2\pi i f_0 \tau_j)\delta(t - \tau_j), \tag{1-6}$$

where $f_0$ is the bandpass center frequency, and $\tau_j$ and $\beta_j$ are the delay and attenuations of the jth path from $N_{mp}$ paths between the TX and RX. Due to the time dispersive nature of the multipath channel in Equation (1-6), there can be two types of distortion on the transmit signal: (i) inter-carrier interference due to the loss of orthogonality between bases of the same symbol, and (ii) inter-symbol interference (ISI) due to the leakage of energy between consecutive frequency-modulated OFDM symbols.

To illustrate the possible effects of ICI, assuming the waveform represented by Equation (1-4) is transmitted over the channel represented by Equation (1-6), the received signal y(t) is given by Equation (1-7):

$$y(t) = \sum_{m=1}^{M} p_m K_\alpha(t, U_m) \sum_{j=1}^{N_{mp}} \gamma_{j,m} \exp(-2\pi i \tau_j \cot\phi t), \tag{1-7}$$

$$\text{where } \gamma_{j,m} = \beta_j \exp\left(2\pi i\left(-f_0\tau_j + \frac{\tau_j^2}{2}\cot\phi + \tau_j U_m \csc\phi\right)\right).$$

To detect the received signal, the inverse FrFT (IFrFT), as given by Equation (1-1), can be applied to the signal y(t), $$r_l = \int_0^T y(u) K_\alpha^*(u, U_l)\,du = \sum_{m=1}^{M} p_m \sum_{j=1}^{N_{mp}} \gamma_{m,j,l}\,\mathrm{sinc}(T((U_m - U_l)\csc\phi + \tau_j \cot\phi)), \tag{1-8}$$

where $$\gamma_{m,j,l} = \beta_j \exp\left(2\pi i\left(-f_0\tau_j + \frac{\tau_j^2 + U_m^2 - U_l^2 - T\tau_j}{2}\cot\phi + \left(\tau_j U_m + \frac{T}{2}(U_m - U_l)\right)\csc\phi\right)\right).$$

Equation (1-7) may be re-written in a matrix form as:

$$\underbrace{\begin{bmatrix} r_1 \\ \vdots \\ r_M \end{bmatrix}}_{r} = \underbrace{\begin{bmatrix} \zeta_{1,1} & \cdots & \zeta_{1,M} \\ \vdots & \ddots & \vdots \\ \zeta_{M,1} & \cdots & \zeta_{M,M} \end{bmatrix}}_{Z} \underbrace{\begin{bmatrix} p_1 \\ \vdots \\ p_M \end{bmatrix}}_{p} + \underbrace{\begin{bmatrix} \mathcal{J}_1 \\ \vdots \\ \mathcal{J}_M \end{bmatrix}}_{\mathcal{J}}, \tag{1-9}$$

$$\text{where } \zeta_{l,m} = \sum_{j=1}^{N_{mp}} \gamma_{m,j,l}\,\mathrm{sinc}(T((U_m - U_l)\csc\phi + \tau_j\cot\phi)) \tag{1-10}$$

and $\mathcal{J}$ is the aggregation of the additive noise and interference. The matrix Z depends on many parameters whose values are unknown. The most significant parameters are the terms $\exp(-2\pi i f_0 \tau_j)$ within the parameter $\gamma_{m,j,l}$. The value of each term $\exp(-2\pi i f_0 \tau_j)$ can fluctuate abruptly even when the user position or the environment changes slightly. It is therefore typically necessary to perform an a-priori estimation of the channel matrix Z. From Equation (1-10) it can be seen that the arguments of the sinc( ) functions depend on the channel tap delays $\tau_j$, which are usually unknown and unpredictable. As a result, the entries outside the main diagonal of the channel matrix Z as shown in Equation (1-9) are not necessarily all zero, and consequently the channel matrix Z is not necessarily a diagonal matrix. Thus, for fractional modulation, symbol detection needs to be performed simultaneously across multiple symbols. In comparison, for conventional OFDM signals symbol detection can be performed symbol by symbol.

As can be understood by those skilled in the art, in OFDM, a cyclic prefix (CP) can be used to diagonalize the end-to-end channel matrix. The CP can be a guard interval of a certain length added to the beginning of a symbol, so as to deal with ISI. The CP can be an exact copy of the ending portion of the current symbol, so as to deal with ICI. To illustrate, the signal transformation between an input signal (p) and an output signal (r) in a CP-OFDM process can be represented by $$r = \underbrace{F\overbrace{CP^{remove}HCP^{insert}}^{\hat{H}}F^{-1}}_{\Sigma}p, \tag{1-11}$$

where $CP^{insert}$ is a guard insertion matrix $$CP^{insert} = \begin{bmatrix} 0_{M_{cp}\times(M\text{-}M_{cp})} & I_{M_{cp}\times M_{cp}} \\ I_{(M\text{-}M_{cp})\times(M\text{-}M_{cp})} & 0_{(M\text{-}M_{cp})\times M_{cp}} \\ 0_{M_{cp}\times(M\text{-}M_{cp})} & I_{M_{cp}\times M_{cp}} \end{bmatrix},$$

$CP^{remove}$ is a guard removal matrix $$CP^{remove} = \begin{bmatrix} 0_{M\times M_{cp}} & I_{M\times M} \end{bmatrix},$$

$$F = [f_{k,n}]_{\substack{n=0\ldots M-1\\ k=0\ldots M-1}} \quad f_{k,n} = e^{-\frac{2\pi ikn}{N}}, \text{ and}$$

$$H = [h_{k,m}]_{\substack{m=-M_{cp}\ldots M-1\\ k=-M_{cp}\ldots M-1}} \quad h_{k,m} = \sum_{j=1}^{N_{mp}} \beta_j \exp(-2\pi i f_0 \tau_j)\mathrm{sinc}\left(\frac{m-n}{2BW} - \tau_j\right),$$

where O and I are zero and identity matrices, H is the equivalent channel matrix sampled according to the Nyquist criterion, M denotes the number of symbols sub-channels (data symbols) per OFDM symbol, and $M_{cp}$ denotes the number of time-domain guard samples for CP insertion.

It can be shown that with the above selection of the guard insertion and guard removal matrixes, the equivalent channel matrix Σ is a diagonal matrix so long as $M_{cp}$ contains all the multipath arrivals of the channel. With these choices, the left and the right singular vectors of the channel are related to the Fourier bases through the following decomposition $$H = \underbrace{CP^{remove^{-1}}F^{-1}}_{\text{Left Eigenvectors}}\sum \underbrace{FCP^{insert^{-1}}}_{\text{Right Eigenvectors}} \tag{1-12}$$

In an embodiment of the present disclosure, the above OFDM modulation techniques are adopted to simplify signal modulation in the fractional domain. It is expected that it would be possible to utilize the basic structure of the OFDM communication processing to embed data in the fractional domain, particularly when the equalization and detection steps take place at different points in the signal processing pipeline at the receiving end.

Figure 7A:
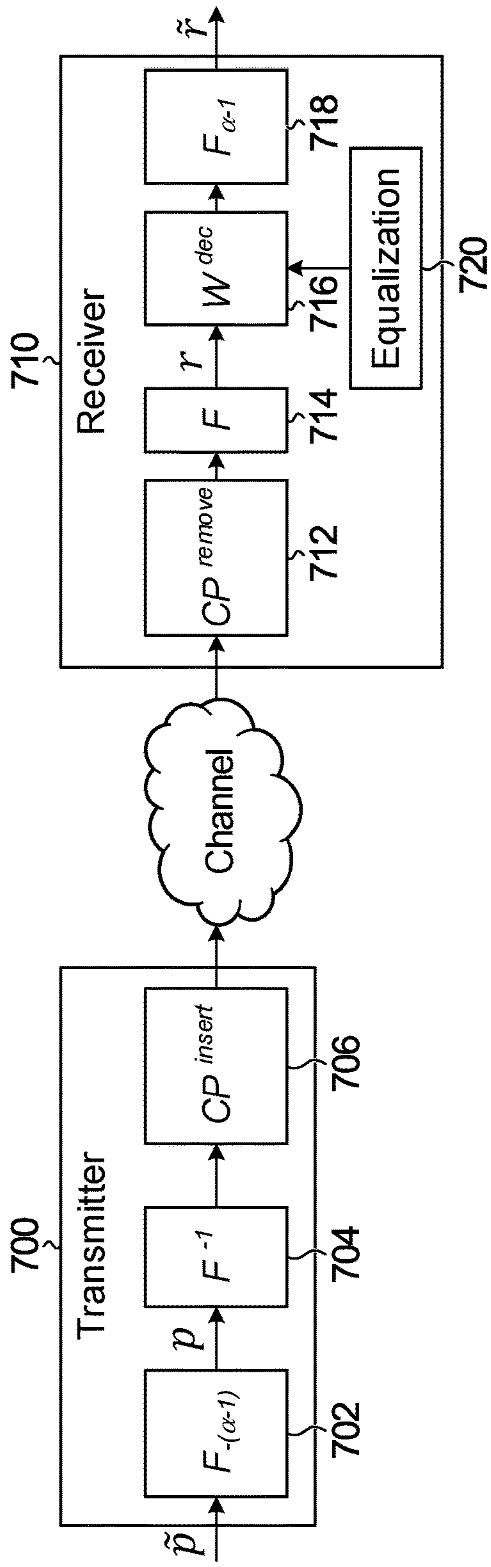
FIGS. 7A and 7B are schematic diagrams illustrating an example process of modulation, transmission, reception and detection/demodulation of frequency-modulated OFDM waveform signals.

An example signal transformation operation according to this embodiment is illustrated in FIG. 7A. Due to the index additivity of FrFT, the process in FIG. 7A can be alternatively represented as shown in FIG. 7B.

Figure 7B:
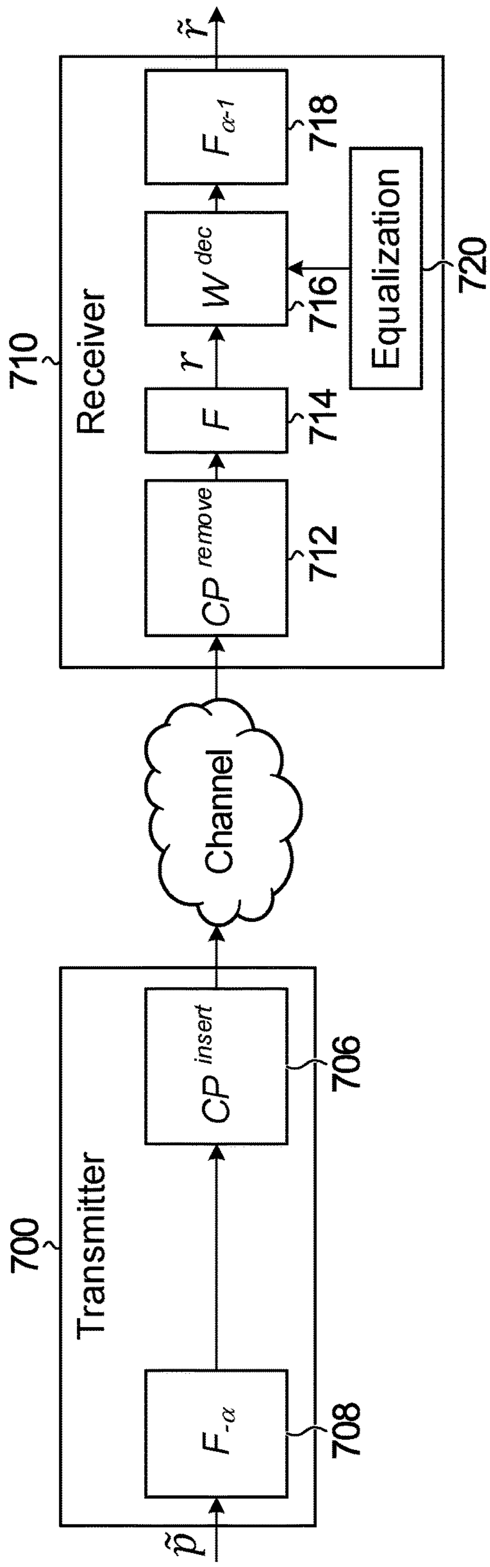

In the process illustrated in FIG. 7A or FIG. 7B, it is assumed that the input signal to be transmitted is $\tilde{p}$, and the output signal obtained at the receiving end is P. The input signal $\tilde{p}$ may include or represent modulated symbols that generated from a sequence of bits. It is also assumed that the input signals are to be transmitted in a fractional domain indicated by a fractional order α. The modulated symbols are precoded by fractional modulation using a fractional modulation operator ($F_{-(\alpha-1)}$) in the −(α−1) domain. The resulting precoded symbols are represented by the signal p, i.e., $p=F_{-(\alpha-1)}\,\tilde{p}$ This fractional transformation is a linear transformation as the fractional operator is a linear operator.

The signals $\tilde{p}$ and $\tilde{r}$ may be represented in the form of vectors, and the modulation operators may be represented by matrices. The modulation operation can thus be implemented by multiplication of the corresponding operator matrix with the signal vector, such as illustrated in Equation (1-9). The operator matrix may be a precoding matrix.

As can be appreciated, the precoded symbols can then be modulated according to a conventional OFDM-based modulation operation, such as described above in Equations (1-11) and (1-12).

For example, as illustrated in FIG. 7A, the precoded symbols may be subject to a frequency domain Fourier transform by applying the IFT operator ($F_{-1}$) and inserting CP to generate an OFDM-based waveform signal. The IFT operator may be an inverse Fast Fourier Transform (IFFT) operator. The OFDM-based waveform signal is output for transmission through a communication channel.

The total effect of the two operations $F_{-(\alpha-1)}$ and $F_{-1}$ transforms the signal $\tilde{p}$ to the signal p in the −α domain due to index additivity, i.e., $F_{-1}F_{-(\alpha-1)}=F_{-\alpha}$. The operations illustrated in FIG. 7A can thus be simplified as shown in FIG. 7B.

As can be appreciated, in the process illustrated in FIG. 7A or 7B, the inserted CP is not an exact copy of an end portion of the original symbol because the CP is inserted in a different domain (−α), instead of in the domain of the original symbol.

At the receiving end, the received signal is demodulated as in a conventional OFDM demodulation operation as described above. That is, the received signal is subject to CP removal and a Fourier transformation with the FFT operator (F), and the OFDM demodulated signal is represented by r.

As can be appreciated the relationship between the OFDM demodulated signal (r) and the precoded input signal (p) can be expected to be represented by the Equation (1-11), i.e., r=Σp. Consequently, $=\Sigma F_{-(\alpha-1)}\tilde{p}$.

It is noted that a forward linear operation on the input signal at the transmitter can be uniquely cancelled through the inverse operation on the received signal at the receiver. It is thus expected that the output signal $\tilde{r}=F_{\alpha-1}r$ would be a signal in the same domain as the signal $\tilde{p}$, because $\tilde{r}=F_{\alpha-1}\,\Sigma F_{-(\alpha-1)}\,\tilde{p}$.

However, the end-to-end channel matrix $\tilde{\Sigma}=F_{\alpha-1}\,\Sigma F_{-(\alpha-1)}$ is not necessarily a diagonalized matrix. As can be appreciated by those skilled in the art, a diagonalized end-to-end channel matrix would be desirable as it allows simplified receiver design and can save valuable communication resources.

Thus, the demodulated signal r is next subjected to an equalization operation ($W^{dec}$) before it is further decoded by multiplication with the fractional operator matrix of $F_{(\alpha-1)}$.

In an example embodiment, $W^{dec}$=E, where E is the equalization operator or matrix. The output signal $\tilde{r}$ can thus be presented by $\tilde{r}=F_{\alpha-1}\,E\Sigma F_{-(\alpha-1)}\,\tilde{p}$.

In alternative embodiments, a more generalized approach may be used where the equalization operation may be applied through a linear or non-linear operator (g( ) of the equalization matrix E and channel matrix Σ to obtain the equalized channel matrix, i.e., $\tilde{\Sigma}$=g(E, Σ).

It is noted that because the fractional modulation operator $F_{\alpha-1}$ is a unitary transformation operator, the matrix $\tilde{\Sigma}=F_{\alpha-1}/F_{-(\alpha-1)}$ is a diagonal matrix, where I is the identity matrix. While the equalized channel matrix Σ (e.g., EΣ) may or may not be an identity matrix, when the matrix EΣ is closer to the identity matrix, less ICI between different subcarriers can be expected. Thus, the choice of the equalization matrix can affect the extent of ICI in the subsequent decoding operation.

As now can be understood, conveniently, the non-symmetric modulation and demodulation of the symbols in the fractional domains $-\alpha$ and $(\alpha-1)$ as illustrated in FIG. 7A can result in a diagonal transmission channel when the equalization operation and decoding (detection) operation are performed at different points in the receiver signal processing pipeline when the waveform signal is transformed and transmitted in the fractional domain.

In the embodiment illustrated in FIG. 7A, the FrFT modulation includes a precoding stage and an OFDM modulation stage. In this example, the precoding includes fractional modulation in the fractional domain $[-(\alpha-1)]$. The precoding may be implemented by multiplication of a fractional modulation operator $F_{-(\alpha-1)}$, which may be represented as a matrix, and the input symbol vector. In other embodiments, the precoding can include one or more further processing or modulation operations. For example, precoding may include DFT or IDFT followed by fractional modulation to achieve some desirable properties for the transmitted waveform.

Hardware and software implementation of the modulation process shown in FIG. 7A may be conveniently designed by adding a precoding block to existing OFDM functional blocks, such as in a transmitter or a baseband processor chip. The OFDM functional blocks may include an OFDM block and a CP block, or an integrated CP-OFDM block.

For example, as illustrated in FIG. 7A, at a transmitting end, such as in a transmitter 700, the precoding block may include a precoding block 702, and the OFDM functional blocks may include an IFT block 704 and a CP-insertion block 706. At the receiving end, such as in a receiver 710, the functional blocks may include a CP-removal block 712, an FT block 714, an equalization block including blocks 716 and 720, and a decoding block 718. Two or more functional blocks may be integrated in hardware or software. For example, as depicted in FIG. 7B, the precoding block and IFT block may be integrated into a fractional frequency-modulation block 708. One or more of the functional blocks in FIG. 7A, and in other figures, may be implemented in hardware, software, or any combination thereof.

Figure 8A:
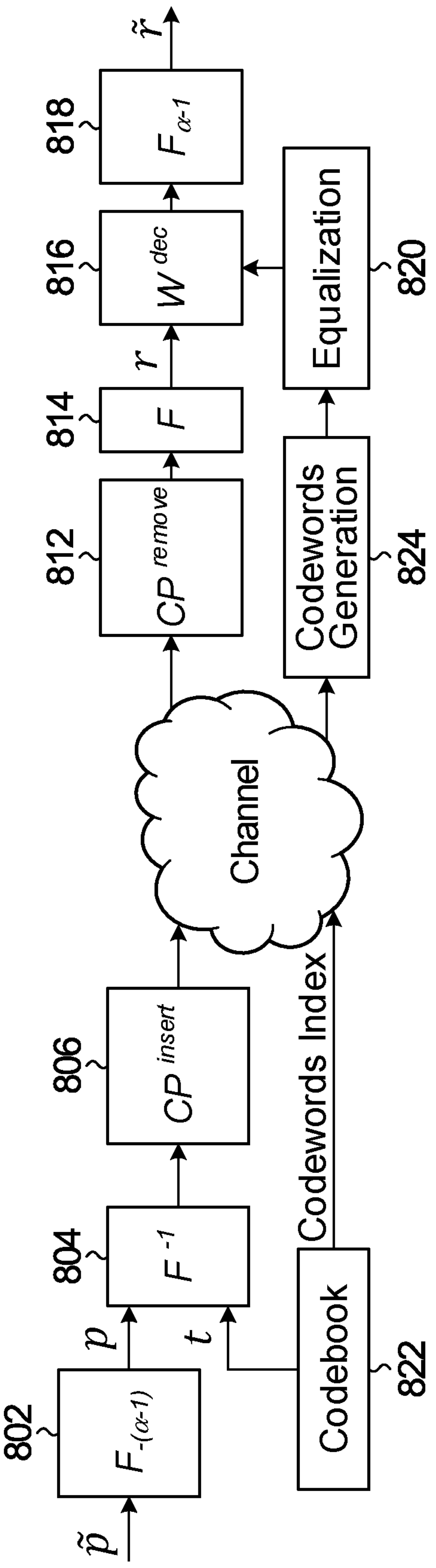
FIGS. 8A and 8B show schematic diagrams illustrating two other example processes for modulation, transmission, reception and detection/demodulation of frequency-modulated OFDM waveform signals, where data and pilot symbols are interleaved.

In an example embodiment as illustrated in FIG. 8A, the precoded symbols in a fractional domain (e.g., domain $-(\alpha-1)$) may be interleaved with pilot symbols, which may be utilized to reduce ICI as will be discussed further below. In this case, as the pilot symbols may be inserted in a domain that is different from the domain of the precoded data symbols, channel equalization may be performed using the pilot symbols inserted after the data symbols have already been precoded.

As depicted in FIG. 8A, input signal $\tilde{p}$ is precoded at block 802 to general signal p. Signal p is modulated at OFDM blocks 804 and 806. Codebook 822 is used to obtain pilot symbols and the pilot symbols (t) are inserted into the signal at block 804 in the OFDM domain. The frequency-modulated OFDM signal with inserted pilot symbols is transmitted to the RX end, and the corresponding codeword index is also indicated to the RX end by signaling. The received signal is processed at CP-removal block 812, FT block 814, equalization block 816 and decoding block 818 to generate the output signal P. At the RX end, the codewords for the pilot symbols are generated based on the received codeword indices. At the Equalization block 816, the pilot symbols are removed based on the generated codewords.

To remove the pilot symbols and use them to equalize the channel effects, the receiving end needs to know which and how the pilot symbols are embedded. Thus, the device or node that inserted the pilot symbols may signal to the receiving device or node an index of the sequence of pilot symbols transmitted (pilot sequence index), such as through a separate signaling channel. The receiving end can then use a pre-obtained or stored codebook to find the transmitted codeword that is needed for equalization and/or other tracking tasks, as can be understood by those skilled in art.

A codeword is a predefined sequence of symbols with certain properties. For example, a pilot combination may be defined as a codeword. A codebook includes all possible codewords to be used in transmission and their respective associated indices, and thus provides a one-to-one mapping between each codeword and its index. The transmitter can send a control signaling to the receiver to indicate the index of the codeword (such as a pilot combination) to be used in a subsequent transmission. The receiver can then generate the corresponding or associated codeword or pilot symbols based on the codeword index using the same codebook. It may be desirable in some applications to limit or reduce the size of the codebook as a larger codebook may require more processing overhead. In example embodiments disclosed herein, the codebook size may be limited, particularly when orthogonality is satisfied.

To reduce the feedback overhead related to transmission of the indices of codewords, the codewords may be transmitted in a sparse fractional domain so that the overhead for transmission and process of the codewords can be reduced. For example, for 8-symbol binary pilot sequences, the codebook size is $2^{16}$ codewords, which requires feedbacks with a size of 16 bits to declare the index of a transmitted codeword. Alternatively, for example, with a sparse pilot $[b_1, 0,0,0,0,0, b_{15}, 0]$ its transformation after precoding may be non-sparse, and require only 10 bits to declare, which include 4 bits to declare the location of the non-zero pilot $b_1$, 4 bits to declare the location of the non-zero pilot $b_{15}$, and 2 bits to declare their binary states. Therefore, pilot insertion at the transmitter and equalization at the receiver may be performed in different domains. In other words, equalization may be performed in a domain different from the domain of detection. By comparison, conventional OFDM signal transmission techniques do not allow the same flexibility for equalization and detection to occur in different domains.

In some embodiments, the pilot sequence index can be preconfigured and can be mapped with a UE ID or a cell ID, or both, similar to in known pilot sequence index mapping techniques for LTE or NR communications.

Figure 8B:
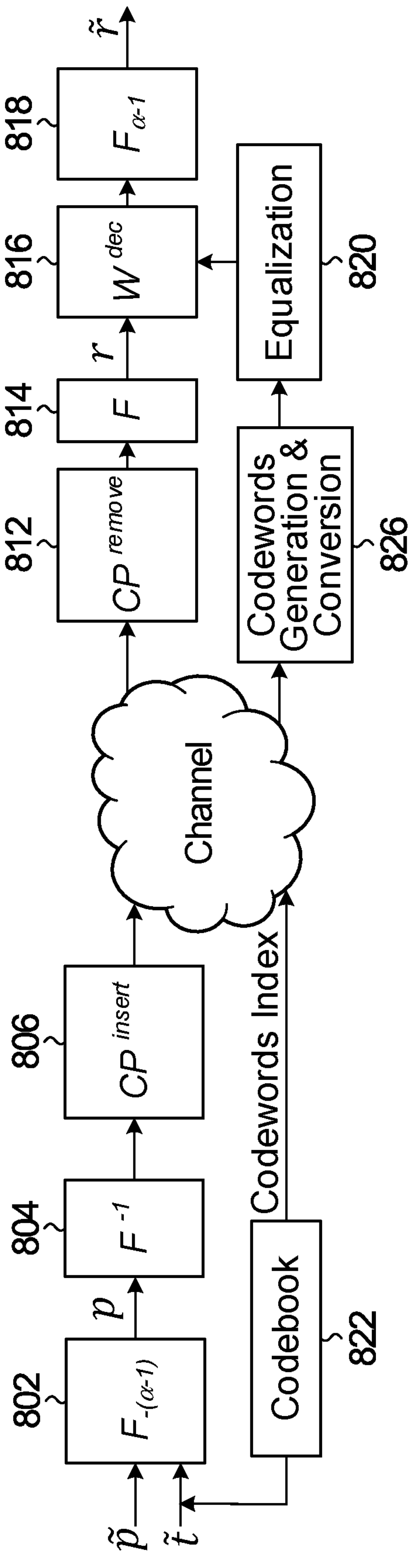

In an alternative embodiment as illustrated in FIG. 8B, pilot symbols CO may be inserted during the precoding operation, such as at block 802 in FIG. 8B, and the precoding of the frequency modulated symbols may include interleaving the frequency-modulated symbols with pilot symbols.

Figure 9A:
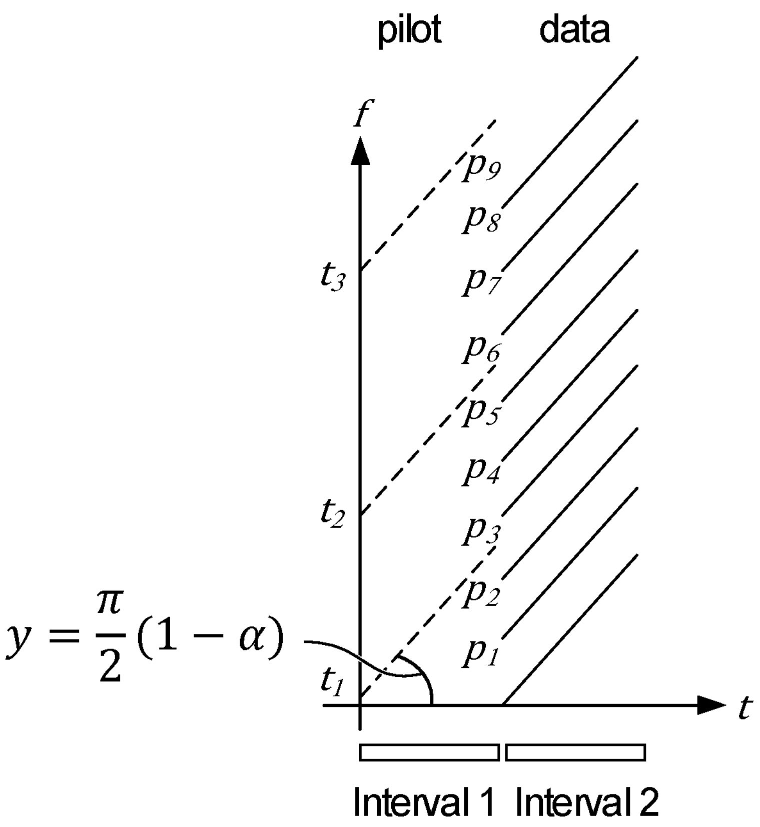
FIGS. 9A and 9B are line graphs illustrating frequency-modulated OFDM waveform signal intervals interleaved with pilot symbols before and after fractional precoding, respectively.
Figure 9B:
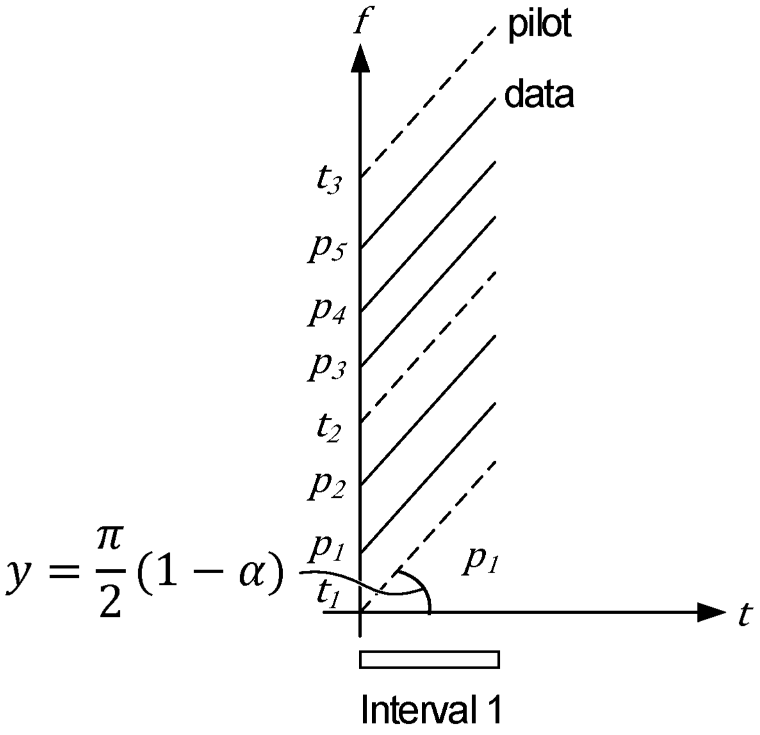

FIGS. 9A and 9B illustrate the interleaving of data symbols (solid lines) with pilot symbols (dash lines). In FIG. 9A, pilot symbols $(t_1, t_2, t_3)$ at different fractional subcarriers are transmitted in a first interval (Interval 1), and the data symbols ($\rho m$, m=1, . . . 9) are transmitted in a second interval (Interval 2). In FIG. 9B, both the pilot symbols and the data symbols are transmitted in the same interval (Interval 1). As can be seen, pilot symbols may be sparsely interleaved with data symbols. For example, as depicted in FIG. 9A, one pilot symbol is inserted for every three data symbols. The number of data symbols between two consecutive pilot symbols may vary and be selected by those skilled in the art.

In FIGS. 9A and 9B, the chirp bases representing the pilot and data symbols all have the same chirp slope, or frequency change rate (γ), which is represented by the slope of the straight lines in FIGS. 9A and 9B. The chirp slope γ is dependent on the fractional order α, and can be determined according to the equation, γ=(π/2)(1−α).

Figure 10A:
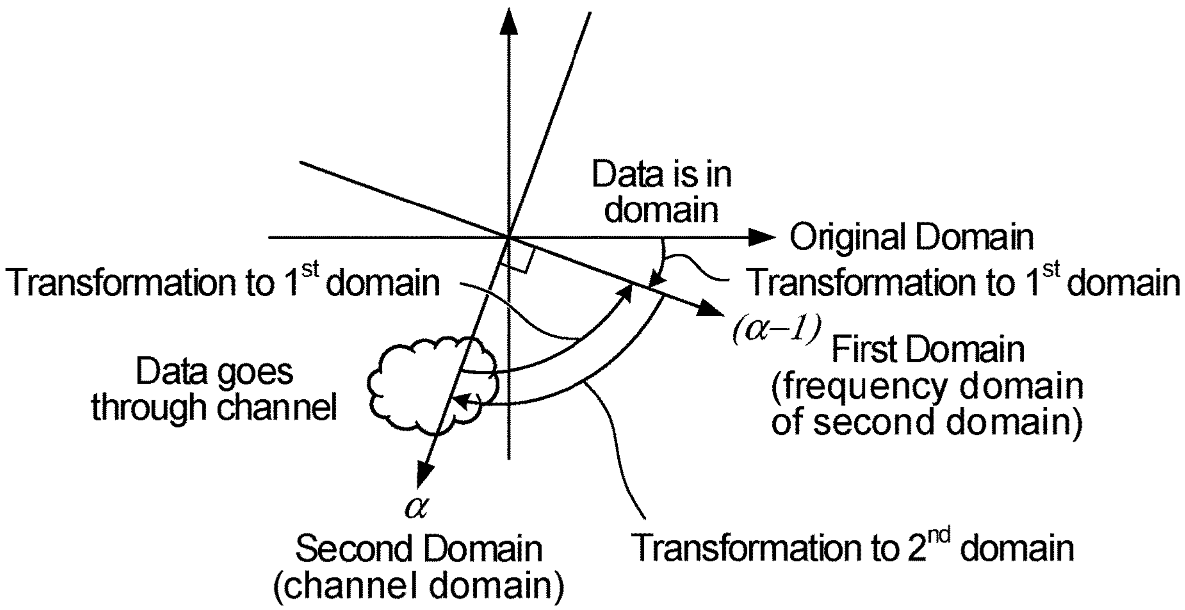
FIGS. 10A, 10B, and 10C are line diagrams illustrating a representation of a data detection process of a frequency-modulated OFDM waveform signal.
Figure 10B:
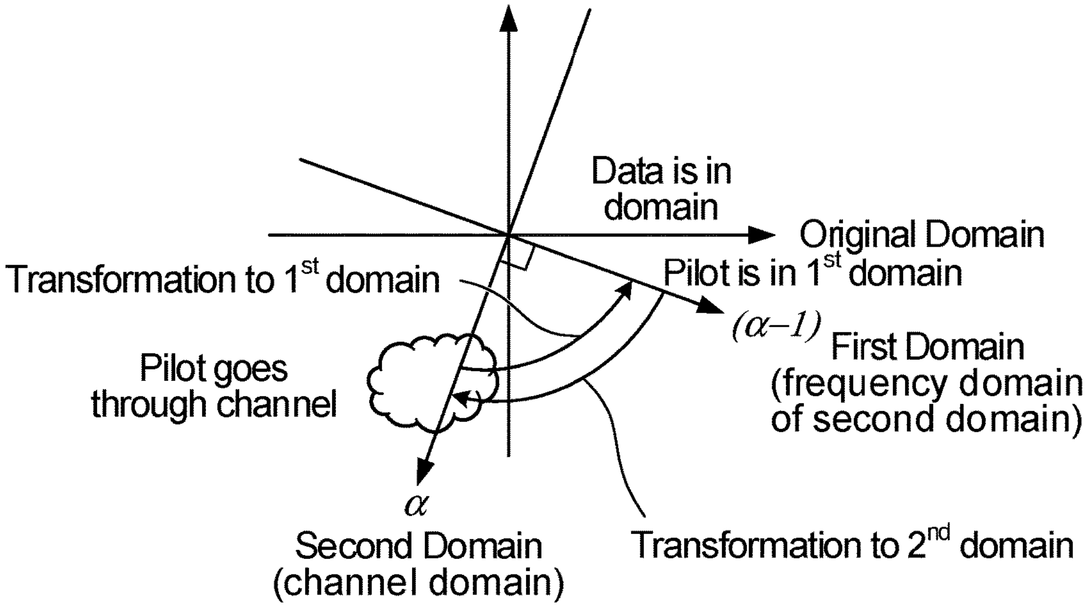
Figure 10C:
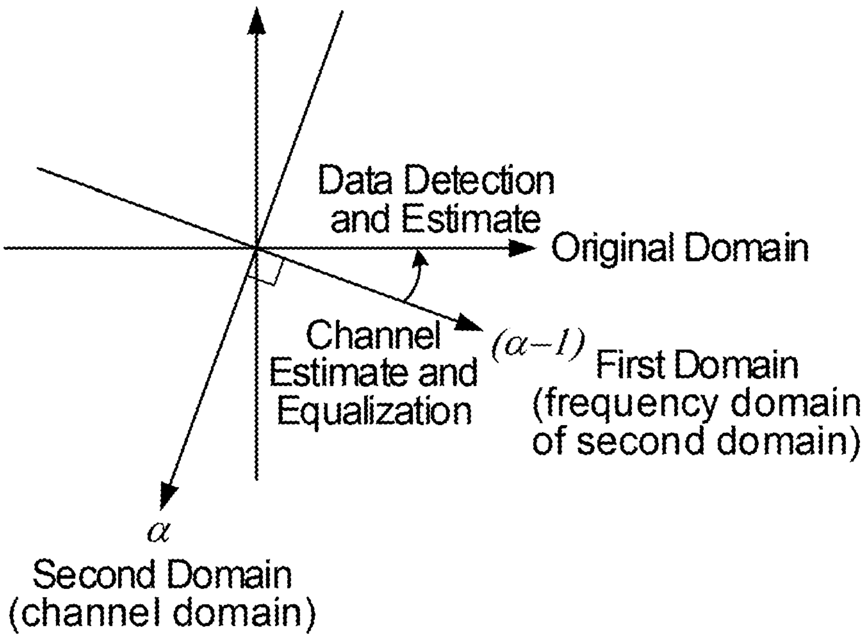

The embodiments illustrated in FIGS. 8A, 8B, 9A and 9B can be better understood with reference to FIGS. 10A, 10B and 10C. As shown in FIGS. 10A-10C, the process of data detection can be understood geometrically through the transportation of data to different domains in three steps: (a) data transmission and reception (FIG. 10A), (b) pilot transmission, and reception (FIG. 10B), and (c) channel estimation, equalization, and data detection (FIG. 10C).

As can be seen, the domain (represented by an axis) in which the channel effect is diagonalized is not necessarily the original domain (the horizontal axis in FIGS. 10A-10C) in which the data symbols to be transmitted are represented. Instead, in the illustrated examples, diagonalization takes place (with the assistance of CP) in the frequency domain of the channel domain (the α domain for the examples shown in FIGS. 10A-10C). In a traditional OFDM transformation (α=−1), the two axes would be aligned in FIGS. 10A-10C. However, in general, these two domains may not be the same (as shown by the two crossed axes in FIGS. 10A-10C. The frequency domain is not necessarily the domain with α=1. Instead, the frequency domain is defined relative to the channel domain.

The fractional modulation described above may also be viewed as the multiplication of the OFDM waveform with a chirp waveform. For example, Equation (1-4) may be rearranged as:

$$s_\alpha(u) = Z_\phi e^{-\pi i u^2 \cot\phi} \times \sum_{m=1}^{M} v_m e^{2\pi i m(\Delta u \csc\phi)u} \quad 0 < u < T, \tag{1-13-1}$$

wherein $$\begin{bmatrix} v_1 \\ v_2 \\ \vdots \\ v_M \end{bmatrix} = \begin{bmatrix} p_1 \\ p_2 \\ \vdots \\ p_M \end{bmatrix} \odot \begin{bmatrix} \exp(-\pi i \Delta u^2 \cot\phi) \\ \exp(-\pi i 2^2 \Delta u^2 \cot\phi) \\ \vdots \\ \exp(-\pi i M^2 \Delta u^2 \cot\phi) \end{bmatrix}. \tag{1-13-2}$$

Upon inserting the CP, as described above and illustrated in FIG. 7A, the signal is given by, $$\tilde{s}_\alpha(u) = \begin{cases} s_\alpha(u) & 0 < u < T \\ s_\alpha(u+T) & -T_{cp} < u < 0 \end{cases}. \tag{1-13-3}$$

Substituting $s_\alpha(u)$ into Equation (1-13-3), $$\tilde{s}_\alpha(u) = Z_\phi e^{-\pi i u^2 \cot\phi} \begin{cases} \sum_{m=1}^{M} v_m e^{2\pi i m(\Delta u \csc\phi)u} & 0 < u < T \\ C_\phi \left\{ \sum_{m=1}^{M} v_m e^{2\pi i m(\Delta u \csc\phi)(u+T)} \right\} e^{-2\pi i (T\cot\phi)u} & -T_{cp} < u < 0 \end{cases}, \tag{1-13-4}$$

where the constant $C_\phi = \exp(-\pi i T^2 \cot\phi)$.

Assuming that $$T^2 \cot\phi = \frac{TB}{M} \in \mathbb{N}^{even}$$

where B is the total fractional modulation signal bandwidth, $C_\phi=1$, the waveform can be written as $$\tilde{s}_\alpha(u) = g(u) W_{cp\text{-}ofdm}\left(u, \{v_m\}_{m=1}^{M}, \Delta u \csc\phi\right), \tag{1-13-5}$$

where the CP-OFDM waveform $W_{cp\text{-}ofdm}$ can be obtained as:

$$W_{cp-ofdm}\left(u, \{v_m\}_{m=1}^{M}, \Delta f\right) = \begin{cases} \sum_{m=1}^{M} v_m e^{2\pi i m \Delta f u} & 0 < u < T \\ \sum_{m=1}^{M} v_m e^{2\pi i m \Delta f(u+T)} & -T_{cp} < u < 0 \end{cases}, \tag{1-13-6}$$

and $$g(u) = Z_\phi e^{-\pi i u^2 \cot\phi} \begin{cases} 1 & 0 < u < T \\ e^{-2\pi i (T\cot\phi)u} & -T_{cp} < u < 0 \end{cases}. \tag{1-13-7}$$

The function g(u) is a piecewise linear frequency modulation function (also referred to as "compounded chirp" herein). The beginning part of the waveform is an exact copy of the ending part of the waveform, as illustrated in the FIG. 11.

Figure 11:
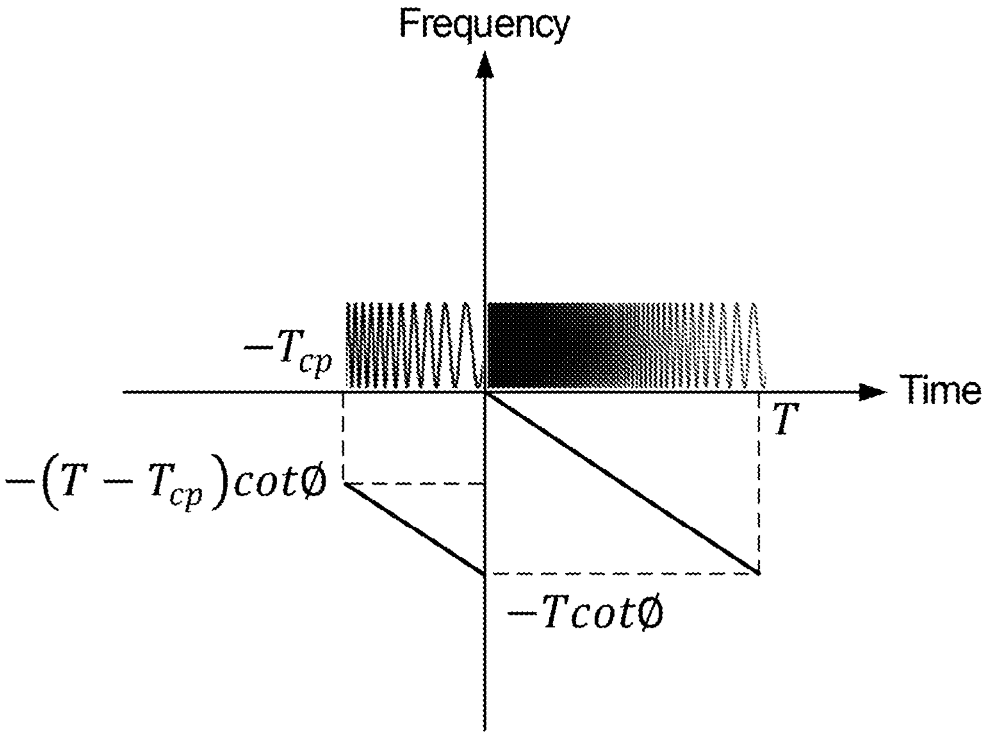
FIG. 11 is a line diagram illustrating a representation of a chirp function suitable for generating frequency-modulated OFDM symbols.
Figure 12:
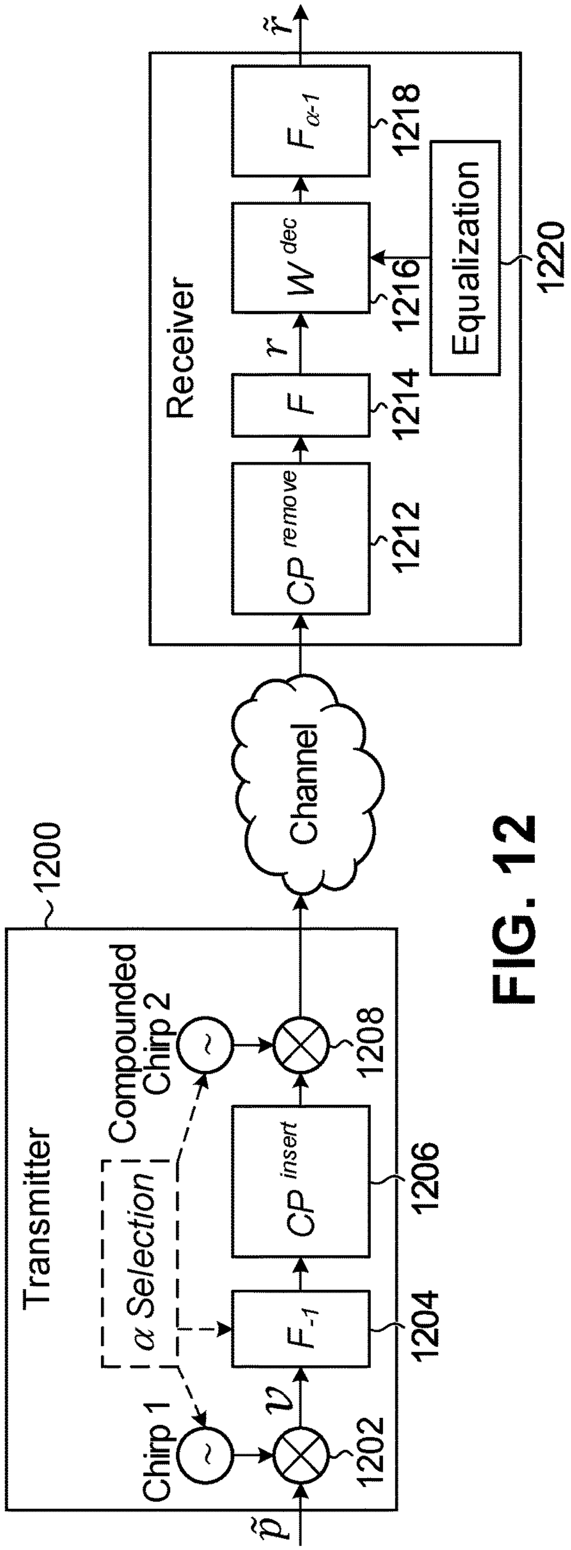
FIG. 12 is a schematic diagram illustrating an example process including modulation, transmission, reception and detection/demodulation of frequency-modulated OFDM waveform signals, wherein multiple chirp multiplication operations are performed prior to and after OFDM respectively at the transmitter, utilizing the chirp function shown in FIG. 11.

Under this representation, the fractional modulation can be re-expressed as the multiplication of a CP-OFDM signal with two chirp signals as shown in FIG. 12. In FIG. 12, the first chirp (Chirp 1) may be represented by Equation (1-2) and as illustrated in FIG. 6A, and the second chirp signal (Chirp 2) may be represented by Equation (1-13-7) and as illustrated in FIG. 11. Chirp 2 in FIG. 12 is a piecewise linear frequency modulation function, or "compounded chirp." The subcarrier spacing (Δf) for the OFDM is a domain dependent parameter, Δf=Δu csc ϕ.

As depicted in FIG. 12, at the transmitter 1200, input signal p̃ is precoded at block 1202, by multiplication with Chirp 1, to general precoded signal v. Precoded signal v is modulated at OFDM blocks 1204 and 1206, and subject to a further chirp multiplication by Chirp 2 at block 1208. At the receiver 1210, the received signal is processed at blocks 1212, 1214, 1216 and 1218, similarly as at blocks 712, 714, 716 and 718 in FIG. 7A, to generate the output signal P.

Figure 13:
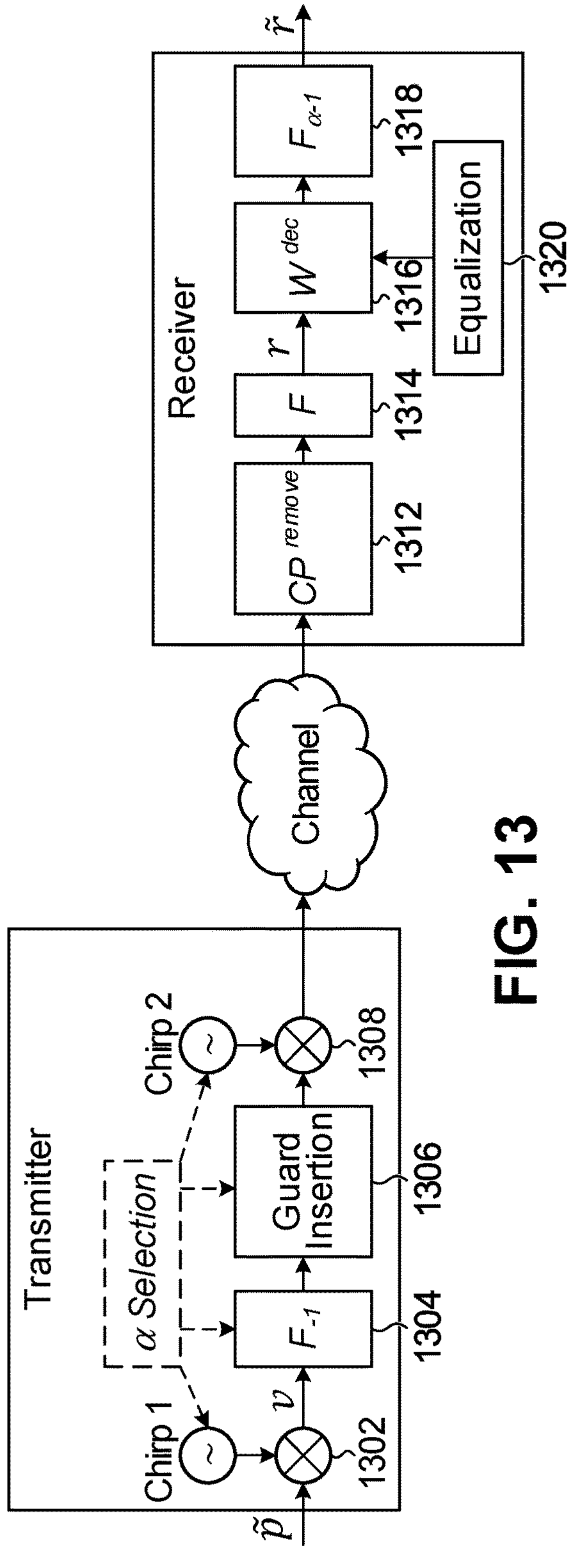
FIG. 13 is a schematic diagram illustrating another example process including modulation, transmission, reception and detection/demodulation of frequency-modulated OFDM waveform signals, wherein multiple chirp multiplication operations are performed prior to and after OFDM respectively at the transmitter.

A modified embodiment is illustrated in FIG. 13. The transmitter 1300 with its functional blocks 1302, 1304, 1306, 1308 is similar to the transmitter 1200 in FIG. 12, but the second chirp, Chirp 2 at block 1308 in FIG. 13 may also be represented by Equation (1-2) and have properties as illustrated in FIG. 6A. Block 1306 may include a guard interval insertion operation. The receiver 1310 and its functional blocks 1312, 1314, 1316, 1318 are similar to the receiver 1210 and its functional blocks in FIG. 12.

The above embodiments allow the existing CP-OFDM based radio devices and equipment be conveniently adapted for use in generating, transmitting and receiving frequency-modulated OFDM waveform signals according to these embodiments. For example, the operations described above and illustrated in FIGS. 7A-7B provide a nested architecture using a FrFT-based precoding matrix. The operations illustrated in FIGS. 12 and 13 include multi-stage chirp multiplication, in which setting $\alpha=\pi/2$ would revert modulation operations to CP-OFDM modulation. Further, the second chirp multiplication (with Chirp 2 shown in FIG. 12 or 13) can be performed in either the baseband or RF domains.

Equation (1-13-4) may also be re-written as in Equation (1-13-8):

$$\tilde{s}_\alpha(u) = Z_\phi e^{-\pi i u^2 cot\phi}\begin{cases} s_\alpha(u) & 0 < u < T \\ s_{GB}(u) & -T_{cp} < u < 0 \end{cases}, \tag{1-13-8}$$

where $s_{GB}(u)$ is now a guard band defined by $$s_{GB}(u) = C_\phi s_\alpha(u+T)e^{-2\pi i(T\cot\phi)u}. \tag{1-13-9}$$

In yet another embodiment, the guard interval is not cyclic but a modulated version of the conventional CP, $s_\alpha(u+T)$, $-T_{cp}<u<0$. In exchange of this modification, the second chirp (post IFFT, Chirp 2) will be the same as the chirp applied pre-IFFT (Chirp 1).

In another embodiment, a suitable symbol duration may be specifically selected for implementing the fractional modulation. The symbol duration may be selected to allow CP insertion and chirp multiplication.

Assuming the sequence $s_\alpha(u)e^{-2\pi i(T\cot\phi)u}$ is periodic with periodicity T, it follows that $s_\alpha(u)e^{-2\pi i(T\cot\phi)u} = s_\alpha(u+T)e^{-2\pi i(T\cot\phi)(u+T)}$. For this to be possible, two conditions need to be met:

$$\Delta u T \csc\phi = k_1, \text{ and}$$

$$T^2\cos\phi = k_2,$$

where $k_1, k_2 \in \mathbb{Z}$. Assuming $k_1, k_2=1$, Equation (1-13-9) becomes $$s_{GB}(u) = \sum_m v_m e^{2\pi i m u\sqrt{\cot\phi}} = \sum_m v_m e^{2\pi i m u}\Big|_{u\to u\sqrt{\cot\phi}}.$$

It is thus possible, in some embodiments, to change the scaling factor ($\sqrt{\cot\phi}$) post-IFFT, and insert the CP before multiplying the signal with the second chirp, which may be a simple chirp function as discussed above. In other words, the modulating factor $e^{-2\pi i(T\cot\phi)u}$ in Equation (1-13-9) along with the particular choice of symbol duration T and the sub-channel spacing $\Delta u$ manifests itself in the form of a scaling operation on IFFT.

In a further embodiment, a frequency-modulated OFDM waveform signal can be represented as a superposition of M chirp signals with the same chirp slope but with a frequency shift of $\Delta f$ with respect to one another, as shown in Equation (1-14):

$$s_\beta(u) = \sum_{m=0}^{M-1} p_m \exp\left(2\pi i m\Delta f u + i\pi\beta u^2\right)\prod\left(\frac{u}{T}\right), \tag{1-14}$$

where $\Pi(\ )$ is the unit pulse between [0 1], $$\beta = \frac{CB}{MT},$$

Figure 14:
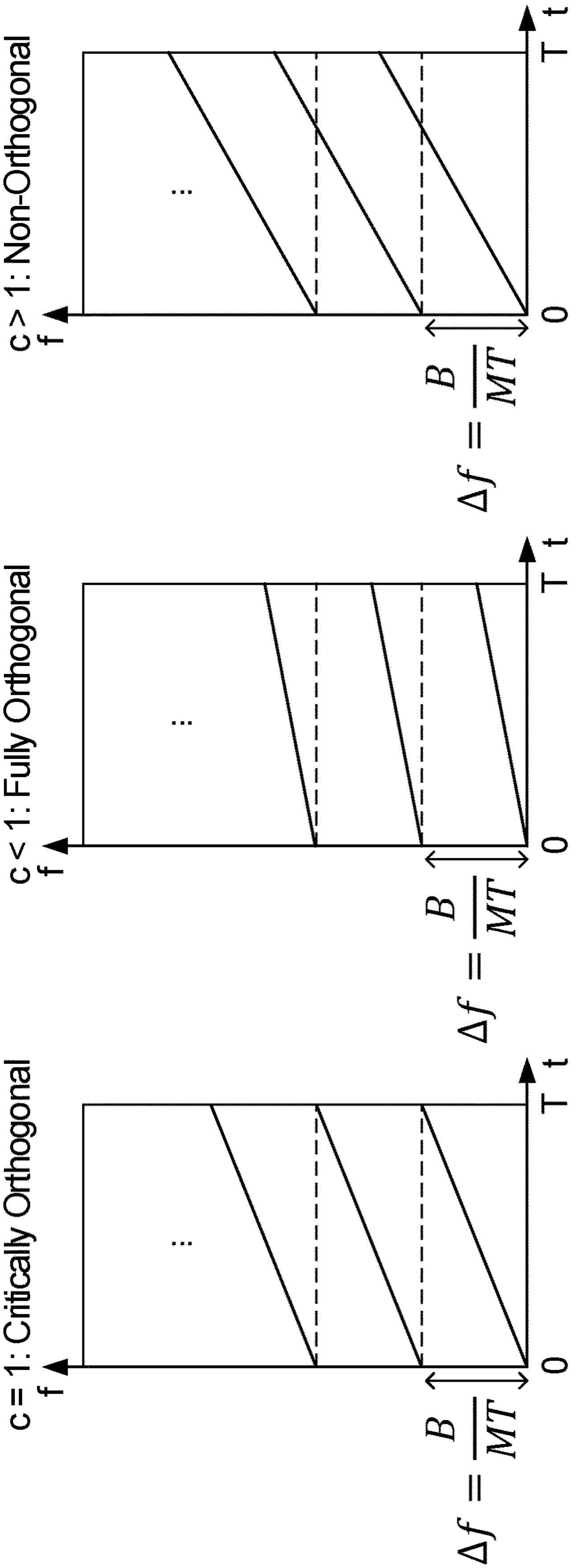
FIG. 14 is a line diagram illustrating orthogonality of different subcarriers with different chirp overlapping factors.

B is the total bandwidth, C is the chirp overlapping factor, and $$\Delta f = \frac{B}{M}$$

is the sub-chirp spacing. This waveform representation is without CP and a schematic representation of the waveform with different values of C is depicted in FIG. 14. As illustrated, when C=1, the chirps do not overlap in frequency within the time period T, but may become overlapping with a slight frequency shift so the chirps are critically orthogonal. When C<1, the chirps do not overlap at all and are fully orthogonal. When C>1, the chirps overlap and are non-orthogonal.

In some embodiments, an overlap parameter may be used to indicate the overlap factor (C) of chirp functions (bases) in frequency-modulated subcarriers. An overlap parameter may be indicated when successive frames are transmitted in overlapped frequency-modulated subcarriers. The overlap parameter may also indicate the overlapping between consecutive frames in time (temporal overlapping).

In an embodiment, CP may be added to the beginning of the waveform to yield:

$$\tilde{s}_\beta(u)\begin{cases} s_\beta(u) & 0<u<T \\ s_\beta(u+T) & -T_{cp}<u<0 \end{cases} =$$

$$\begin{cases} \exp\left(i\pi\beta u^2\right)\sum_{m=0}^{M-1} p_m \exp(2\pi i m\Delta f u) & 0<u<T \\ \exp\left(i\pi\beta u^2\right)\exp(2\pi i\beta uT)\sum_{m=0}^{M-1} p_m \exp(2\pi i m\Delta f(u+T)) & -T_{cp}<u<0 \end{cases} =$$

$$g(u)W_{cp-ofdm}\left(u, \{p_m\}_{m=0}^{M-1}, \Delta f\right)$$

where $$g(u) = \exp\left(i\pi\beta u^2\right)\begin{cases} 1 & 0<u<T \\ \exp(2\pi i C\Delta f u) & -T_{cp}<u<0 \end{cases},$$

and g(u) is a piecewise linear frequency modulation function (compounded chirp).

Figures 15A, 15B, 15C:
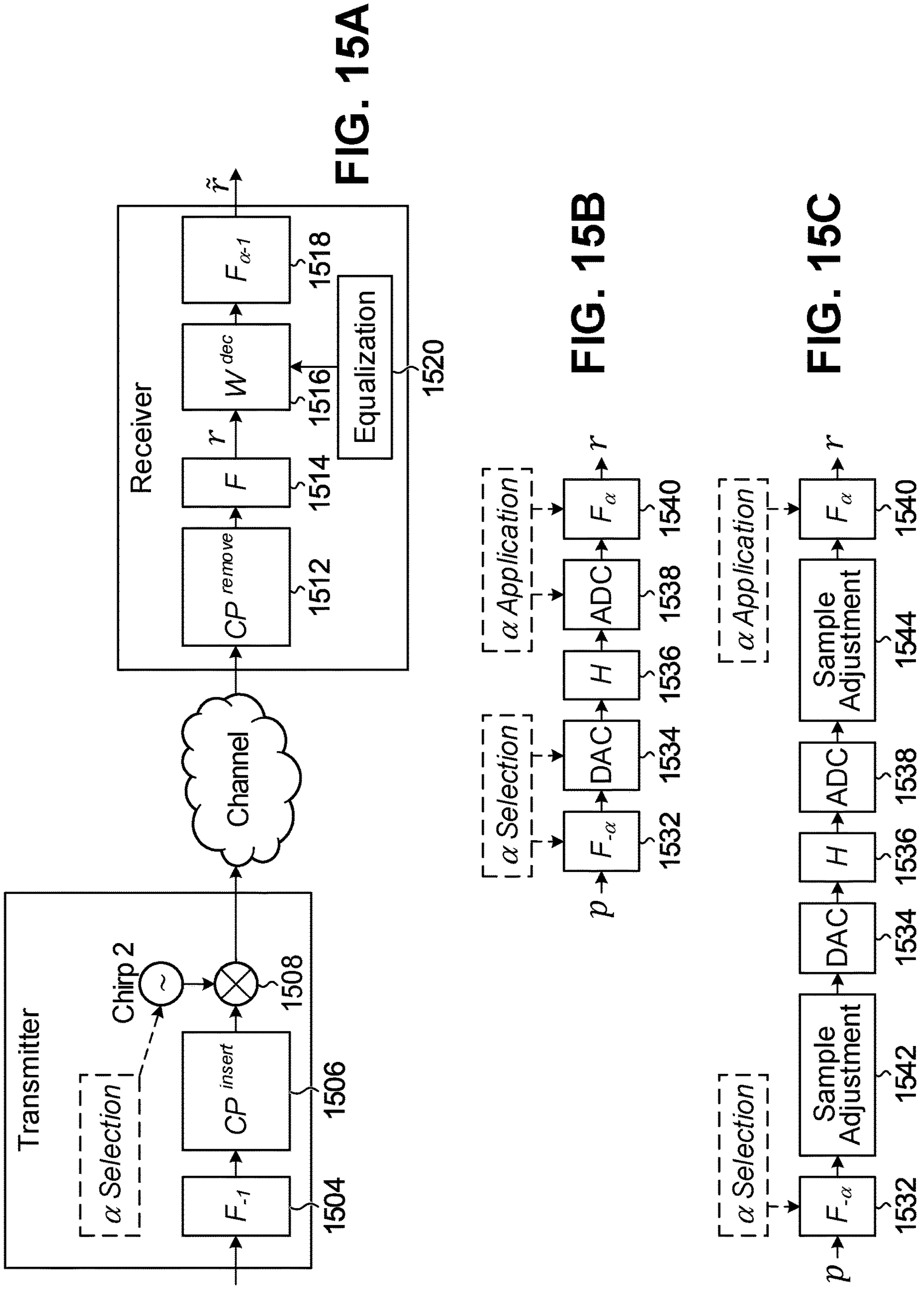
FIG. 15A is a schematic diagram illustrating another example process of modulation, transmission, reception and detection/demodulation of frequency-modulated OFDM waveform signals, wherein a chirp multiplication operation is performed after CP insertion at the transmitter.
FIG. 15B is a block diagram illustrating an example implementation of fractional frequency modulation, where the signal is non-uniformly sampled.
FIG. 15C is a block diagram illustrating an example implementation of fractional frequency modulation, where the signal is non-uniformly trimmed.

In this embodiment, a CP-OFDM transmitter circuitry may be adapted for modulating the waveform as illustrated in FIG. 15A.

As depicted in FIG. 15A, the transmitter 1500 has functional blocks 1504, 1506, and 1508, and receiver 1510 has functional blocks 1512, 1514, 1516, and 1518, which are similar to the corresponding functional blocks in transmitter 1300 and receiver 1310 of FIG. 13. However, transmitter 1500 has only one chirp block 1504. Thus, blocks 1502 and 1504 may be provided with a conventional CP-OFDM transmitter circuitry.

There are two differences between the transmitter 1500 shown in FIG. and the transmitter 1200 or transmitter 1300 shown in FIGS. 12 and 13 respectively. First, only one chirp signal is multiplied by the CP-OFDM signal after the signal is generated based on the input symbols $\{p_m\}$ in FIG. 15A. The chirp multiplication can be in the baseband domain or in the RF domain. Secondly, in FIG. the OFDM transmitter parameters (numerology) are not dependent on the chirp parameter β and are only functions of the subcarrier spacing. As the FrFT numerology (subcarrier spacing and chirp slope) is realized with two independent operations (OFDM modulation and chirp multiplication) in this embodiment, it is easier to implement.

It is noted that regardless of how the FrFT is implemented or represented, the fractional modulation can be performed over one or more sub-bands or BWPs of the entire carrier bandwidth, instead over the entire carrier bandwidth. This can beneficially leave the remaining carrier bandwidth available for conventional OFDM.

The fractional modulation can alternatively or additionally be performed over a subset of the time-domain symbols, instead of the entire set of input symbols, which allows for flexible time-domain multiplexing between conventional OFDM and frequency-modulated OFDM.

For example, in an embodiment as shown in FIGS. 7A and 7B, the precoding operation ($F_{-(\alpha-1)}$) may be switched ON, i.e., performed, over a selected sub-band/BWP or subset of the input symbol(s). In an embodiment as shown in FIG. 12, the chirp 1 multiplication and chirp 2 multiplication may be activated over only a selected sub-band/BWP or subset of input symbol(s). In an embodiment as shown in FIG. 15A, the chirp 2 multiplication may be activated over only a selected subband/BWP or subsect of input symbol(s).

Accordingly, it is possible to provide flexible and smooth waveform adaptation by selectively turning ON/OFF or activate/deactivate certain modulation or processing operations for each sub-band or subset of symbols.

Regardless of the FrFT implementation or representation, it is also possible to implement DFT-spread FrFT (DFT-s-FrFT) modulations, similar to a DFT-s-OFDM implementation. For example, in an embodiment, the data symbols (e.g., QAM symbols) may be precoded with a DFT matrix and then apply the FrFT modulation as described herein.

In some embodiments, such as the embodiment shown in FIGS. 7A and 7B, the DFT precoding matrix may be combined with the FrFT precoding matrix to form a DFT-s-FrFT precoding matrix. For example, if the DFT precoding matrix is P and the FrFT precoding matrix is Q, the DFT-s-FrFT precoding matrix can be QP.

For example, in an embodiment, generation of modulated symbols from a sequence of bits may comprise generating a first plurality of modulated symbols from the sequence of bits, and discrete Fourier transform (DFT) precoding the first plurality of modulated symbols to generate a second plurality of modulated symbols. The second plurality of modulated symbols may then be precoded, according to the frequency modulation parameter, to generate a plurality of precoded symbols.

With frequency-modulated OFDM, some errors inherent with the OFDM operations may still be present. For instance, in the presence of phase noise, jitter, lack of tight synchronization, or uncompensated Doppler shift, ICI may be a significant factor in OFDM processing as the channel matrix Σ is no-longer diagonal. In such a case, it is expected that it would not be possible or very difficult to make $\hat{\Sigma}$=EΣ, i.e., an identity matrix, through typical OFDM one-tap equalization with the use of a diagonal matrix E. As a result, the OFDM ICI can affect the later processing stages and render the frequency-modulated subcarriers non-diagonal.

Thus, in some embodiments, non-uniform synthetization and sampling of the transmitted and received signals may be utilized to address the ICI.

In the context of wireless communications, where a wireless channel is represented as a linear system with the channel impulse response (CIR) h(t) as shown in Equation (1-6), the response of the channel to the transmit-side information bearing signal x(t) is given by:

$$y(t) = x(t) * h(t) = \sum_{m=-M_{cp}}^{M-1} p_m \mathrm{sinc}\left(\frac{t - mT_s}{T_s}\right) * \sum_{j=1}^{N_{mp}} \beta_j \exp(-2\pi i f_0 \tau_j)\delta(t - \tau_j) = \sum_{m=-M_{cp}}^{M-1} p_m \sum_{j=1}^{N_{mp}} \beta_j \exp(-2\pi i f_0 \tau_j) \mathrm{sinc}\left(\frac{t - mT_s - \tau_j}{T_s}\right)$$

The above Equation uses the Nyquist reconstruction theorem to represent signal x(t) with its samples $p_m$ taken while respecting the Nyquist sampling theorem. When the signal is sampled uniformly at the receiver, the received samples are given by $$y_n = y(nT_s) = \sum_{m=-M_{cp}}^{M-1} p_m \sum_{j=1}^{N_{mp}} \beta_j \exp(-2\pi i f_0 \tau_j) \mathrm{sinc}\left((n - m) - \frac{\tau_j}{T_s}\right)$$

where $$n = -M_{cp} + \lceil \tau_{min} T_s^{-1} \rceil \ \dots \ M + \lceil \tau_{max} T_s^{-1} \rceil - 1.$$

Mathematically, this is the discrete convolution of the input signal $p=[p_{-M_{cp}} \ldots p_{M-1}]$ with discrete CIR $h=[h_{-M_{cp}} \ldots h_{M-1}]$ given by:

$$h_n = \sum_{j=1}^{N_{mp}} \beta_j \exp(-2\pi i f_0 \tau_j) \mathrm{sinc}\left(n - \frac{\tau_j}{T_s}\right).$$

The above convolution may be represented through a matrix multiplication as in Equation (1-12) of vector p with convolution matrix H, which is given by:

$$H = \begin{bmatrix} h_{(-M_{cp})-(-M_{cp})} & h_{(-M_{cp})-(-M_{cp}+1)} & \cdots & h_{(-M_{cp})-(M-1)} \\ h_{(-M_{cp}+1)-(-M_{cp})} & h_{(-M_{cp}+1)-(-M_{cp}+1)} & \cdots & h_{(-M_{cp}+1)-(M-1)} \\ h_{(-M_{cp}+2)-(-M_{cp})} & h_{(-M_{cp}+2)-(-M_{cp}+1)} & \cdots & h_{(-M_{cp}+2)-(M-1)} \\ \vdots & \vdots & \vdots & \vdots \\ h_{(M-1)-(-M_{cp})} & h_{(M-1)-(-M_{cp}+1)} & \cdots & h_{(M-1)-(M-1)} \end{bmatrix},$$

where $$h_{n,m} = h_{n-m} = \sum_{j=1}^{N_{mp}} \beta_j \exp(-2\pi i f_0 \tau_j) \mathrm{sinc}\left(n - m - \frac{\tau_j}{T_s}\right).$$

Uniform sampling and synthetization can be performed at the analog-to-digital converter (ADC) of the RX and the digital-to-analog converter (DAC) of the TX, respectively, result in a matrix H that has a Toeplitz structure. With $(M_{cp}+M)-1$ diagonal lines, a Toeplitz matrix has similar elements on each of the lines, as can be seen from the above equation, where the uniform sampling resulted in $h_{n,m}=h_{n-m}$.

Channel diagonalization may be achieved when the matrix H is transformed into a circulant matrix $\hat{H}$. This may be achieved through pre- and post-multiplications of H with matrices $CP^{remove}$ and $CP^{insert}$, as shown in Equation (1-11). Provided that the eigenvectors of a circulant matrix are Fourier bases, that is $\hat{H}=F^{-1}\Sigma F$, performing IDFT and DFT on the matrix results in a diagonal matrix Σ. Matrix $\hat{H}$ is expected to be circulant if the transmitted/received signals are synthesized/sampled uniformly at the DAC/ADC, respectively. If the synthetization and sampling operations are not performed uniformly, the matrix H will not be Toeplitz ($h_{n,m}\neq h_{n-m}$), and subsequently, the matrix $\hat{H}$ will not be circulant.

In some embodiments, in a process for frequency modulation of data symbols in a fractional domain, as compared to a conventional OFDM process, the data signal can be sampled and synthesized non-uniformly at times $t_m$ and $t_n$ to create a channel H that may be represented as follows:

$$H = \begin{bmatrix} h_{1,1} & h_{1,2} & \dots & h_{1,N} \\ h_{2,1} & h_{2,2} & \dots & h_{2,N} \\ h_{3,1} & h_{3,2} & \dots & h_{3,N} \\ \vdots & \vdots & \vdots & \vdots \\ h_{N,1} & h_{N,2} & \dots & h_{N,N} \end{bmatrix},$$

where $$h_{n,m} = \sum\nolimits_{j=1}^{N_{mp}} \beta_j \exp(-2\pi i f_0 \tau_j) \mathrm{sinc}\left(\frac{(t_n - t_m - \tau_j)}{T_s}\right).$$

The sampling function $$t_n = g_\alpha^{ADC}(n)$$

and the synthetization function $$t_m = g_\alpha^{DAC}(m)$$

are dependent on the value of α. In some embodiments disclosed herein, the sampling functions are selected to provide a matrix H with eigenvectors of $F_{-\alpha}$.

An example fractional frequency modulation process with non-uniform sampling is illustrated in FIG. 15B. As depicted, the input symbols p is subject to fractional frequency modulation of order α at block 1532 with operator F−α, and DAC operation at block 1534. The modulated waveform signal is transmitted through the channel 1536 (represented by channel matrix H), and the received waveform signal is subject to ADC operation at block 1538 and demodulation at block 1540 with operator Fα to generate the output symbols r.

In some applications, receivers and transmitters may include samplers and synthesizers that are analog components and are not readily modifiable, so it may be challenging to adapt these components to dynamically adjust the sampling and synthetization patterns or rates. In such cases, pre-fixing sampling trimming may be performed at a sample adjustment component or unit before uniform synthesizing at the DAC unit in a TX, and sample adjustment may be performed after uniform sampling at the ADC unit in an RX, respectively.

An example fractional frequency modulation process with non-uniform sample trimming is illustrated in FIG. 15C. As depicted, the input symbols p is subject to fractional frequency modulation of order α at block 1532 with operator F−α, and subject to sample adjustment at block 1542 before the DAC operation at block 1534. The modulated waveform signal is transmitted through the channel 1536 and the received waveform signal is subject to ADC operation at block 1538 and subject to non-uniform trimming at block 1544 before demodulation at block 1540 to generate output symbols r.

It can be understood that, with non-linear sampling, it is possible to provide fractional domain modulation without a nested OFDM-based architecture as shown in FIGS. 7A to 8B. Consequently, some of the drawbacks of OFDM-based modulations may be avoided.

In coherent communication systems, including systems using OFDM technologies, channel estimation is an integral component of the signal processing. In the context of frequency modulated OFDM, the channel may be represented by the matrix Z which can be estimated through transmission of known symbols q, a.k.a. reference signals (RS). To estimate the M×M dimensional matrix Z, transmission of R>M known vectors $$q^{(r)} = \left[q_1^{(r)} \ \dots \ q_M^{(r)}\right]^T,\ r = 1 \dots R,$$

is necessary. The transmission of RSs can be performed using code division multiple access (CDMA), time division multiple access (TDMA), or frequency division multiple access (FDMA), with the condition that transmissions take place within the coherence time of the channel. Assuming this condition is met, the channel estimation can be formulated in matrix form as follows:

$$\underbrace{\begin{bmatrix} \kappa_1^{(1)} & \dots & \kappa_1^{(R)} \\ \vdots & \ddots & \vdots \\ \kappa_M^{(1)} & \dots & \kappa_M^{(R)} \end{bmatrix}}_{K} = \underbrace{\begin{bmatrix} \zeta_{1,1} & \dots & \zeta_{1,M} \\ \vdots & \ddots & \vdots \\ \zeta_{M,1} & \dots & \zeta_{M,M} \end{bmatrix}}_{Z} \underbrace{\begin{bmatrix} q_1^{(1)} & \dots & q_1^{(R)} \\ \vdots & \ddots & \vdots \\ q_M^{(1)} & \dots & q_M^{(R)} \end{bmatrix}}_{Q} + \underbrace{\begin{bmatrix} \mathcal{J}_1^{(1)} & \dots & \mathcal{J}_1^{(R)} \\ \vdots & \ddots & \vdots \\ \mathcal{J}_M^{(1)} & \dots & \mathcal{J}_M^{(R)} \end{bmatrix}}_{\mathcal{J}}, \quad (1\text{-}15)$$

In an embodiment, the symbols $$q_m^{(r)}$$

are selected such that the ultimate matrix Q is a full rank matrix. If Q is a unitary matrix, it would simplify the channel estimation process because $Q^{-1}=Q^T$, which obviates the need to perform costly matrix inversion operations. Given K and Q, and possibly, the knowledge of the statistics of the interference/noise matrix $\mathcal{J}$, the channel matrix Z can be estimated through different algorithmic approaches, such as maximum likelihood (ML), minimum mean square error (MMSE), or the like.

Figure 16:
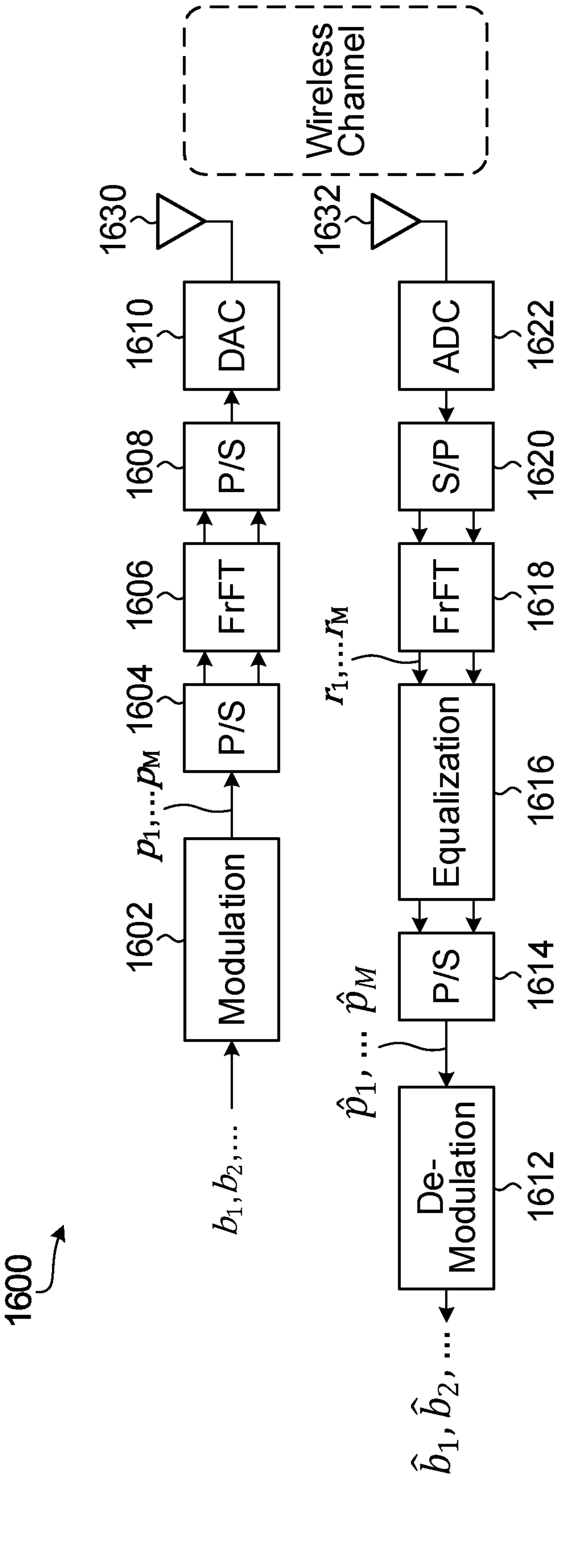
FIG. 16 is a block diagram illustrating an example baseband implementation of frequency-modulated OFDM in an apparatus.

In another embodiment, the transmitter and receiver do not require backward-compatibility with a legacy OFDM waveform. Therefore, a transceiver according to this embodiment may differ more significantly from a conventional OFDM transceiver. An example alternative transceiver architecture is schematically illustrated in FIG. 16. This alternative architecture is not nested with a conventional OFDM transceiver architecture, and equalization and detection can take place at the same point along the receiver processing chain. Due to the features of the FrFT implementations as described above, it is relatively straightforward to estimate the transmitted data symbols $p_1 \ldots p_M$ in Equation (1-9) using the estimated channel Z.

FIG. 16 illustrates an end-to-end digital implementation of a fractional modulation transmitter and receiver in a baseband. As depicted in FIG. 16, a transceiver 1600 may include, on the transmitter side, a modulation block 1602, S/P block 1604, FrFT block 1606, parallel-to-serial (P/S) block 1608, DAC block 1610, and, on the receiver side, ADC block 1622, S/P block 1620, IFrFT block 1618, Equalization block 1616, P/S block 1614, and De-modulation block 1612. The transceiver 1600 also includes a transmitter antenna 1630 and a receiver antenna 1632.

In detecting the transmitted symbols with the alternative architecture shown in FIG. 16, a zero-forcing receiver can take the inverse of the channel matrix first and then multiply the inverse matrix with the sample detected at the output end of the IFrFT to detect the transmitted symbols, as represented by:

$$\begin{bmatrix} \hat{p}_1 \\ \vdots \\ \hat{p}_M \end{bmatrix} = \begin{bmatrix} \zeta_{1,1} & \cdots & \zeta_{1,M} \\ \vdots & \ddots & \vdots \\ \zeta_{M,1} & \cdots & \zeta_{M,M} \end{bmatrix}^{-1} \begin{bmatrix} r_1 \\ \vdots \\ r_M \end{bmatrix}.$$

In some applications or circumstances, a zero-forcing receiver may not be an ideal solution, and other types of detection methods or techniques may be used.

In some applications, it may be desirable to provide waveform designs suitable for integrated sensing and communication, which have the flexibility to adapt to different sensing and communication requirements. As discussed before and can now be appreciated, embodiments described herein can provide flexible waveform designs by adjusting a number of parameters or implementation details for a given integrated sensing and communication resource configuration (bandwidth and time).

Figure 17:
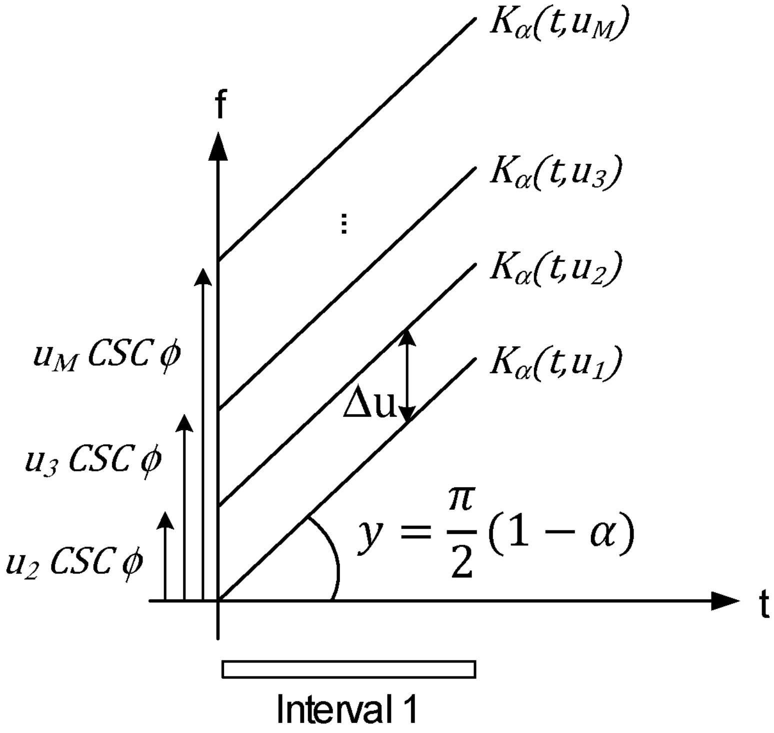
FIGS. 17 and 18 are time-frequency signal representations illustrating different embodiments of modulation of symbols with chirp functions.
Figure 18:
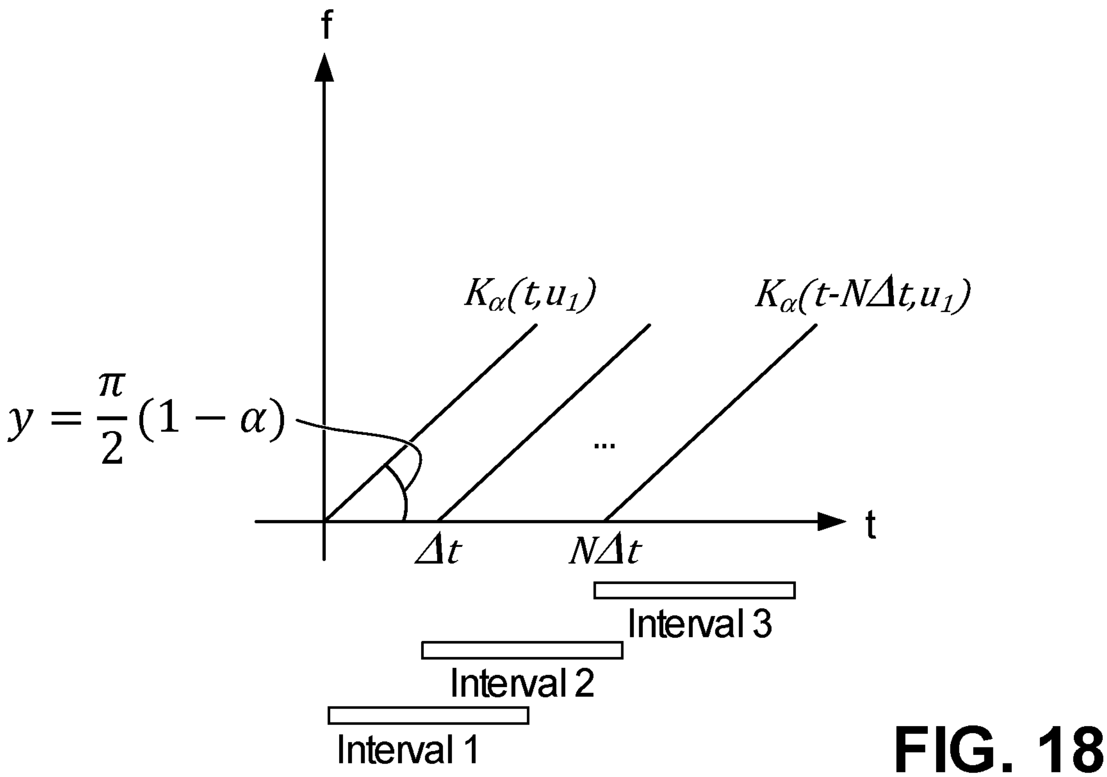

For example, different data embedding methods may be flexibly selected and used. As illustrated in FIGS. 17 and 18, the data may be embedded in chirp bases stacked horizontally (in the time domain) or vertically (in the frequency domain). The chirp bases may also be stacked in a mixed time and frequency domain (mixed or hybrid).

In various embodiments, flexibility can also be provided by selection of the fractional domain parameter or fractional order α, or the chirp overlapping factor C.

In various embodiments, flexibility can be further provided by selecting the fractional spacing, such as Δu in a vertical packing implementation or Δt in a horizontal packing implementation. Alternatively, in some embodiments, the sub-chirp spacing Δf is also selectable and provides flexibility.

As noted previously, the modulated waveforms are not necessarily orthogonal for an arbitrary value of Δu. For fractional modulation, orthogonality can only be achieved for selected values of Δu.

For example, for a vertical embedding method as illustrated in FIG. 17, the orthogonality between the chirp bases $K_\alpha(t, u_m)$ for an interval (Interval 1) of duration T in the fractional domain a can be guaranteed if the separations between the chirp bases are multiples of $$\Delta u = \sin\left(\frac{\pi\alpha}{2}\right)T^{-1}.$$

As discussed previously, the chirp slope γ can be determined by $\gamma=(\pi/2)(1-\alpha)$.

For an embodiment as illustrated in FIG. 17, the orthogonal condition for sub-chirp spacing is $$\Delta f = \frac{m}{T}$$

for some integer m, similar to the condition in CP-OFDM modulation.

For an embodiment of horizontal embedding as depicted in FIG. 18, the intervals (Interval 1, Interval 2, Interval 3) for different chirp bases $K_\alpha(t, u_m)$ overlap in time, and to maintain orthogonality between the horizontally stacked chirp bases, the projection of chirp $K_\alpha(t, u_m)$ on $K_\alpha(t-\Delta t, u_m)$ must be zero by selecting the appropriate horizontal (temporal) separation Δt, such as follows:

$$\int_{\Delta r}^{T} K_\alpha(t, u_m) K_\alpha^*(t-\Delta t, u_m)\,dt = 0, \tag{1-16}$$

which may be simplified as:

$$\frac{\exp(-\pi i \Delta t(T+\Delta t)\cot\phi)}{\pi\Delta t\cot\phi}\cdot\sin(\pi\Delta t(t-\Delta t)\cot\phi) = 0.$$

The left side of the above equation is zero for $\pi\Delta t(t-\Delta t)\cot\phi=k\pi$. This yields the following condition for the choice of Δt:

$$\Delta t^2 - T\Delta t + k\tan\phi = 0 \rightarrow \Delta t = \frac{T}{2} - \sqrt{\left(\frac{T}{2}\right)^2 - k\tan\phi}\,. \tag{1-17}$$

For k=1, 2, . . . the minimum separation is achieved for k=1.

It can also be expected that when $\Delta t_2 \rightarrow 0$, $\Delta t = k\tan\phi T^{-1}$, and the minimum separation is achieved for k=1.

In some embodiments, a fractional spacing parameter may be used to indicate the vertical or horizontal spacing between different frequency-modulated subcarriers or chirp functions. For example, the fractional spacing parameter may be a subcarrier spacing (SCS) parameter. The fractional spacing parameter may be represented by the difference in the fractional domain (Δu) in general, such as in the frequency domain (Δf) when u=f, or in the time domain (Δt) when u=t.

When symbols are to be transmitted in succession, the inter-symbol interference (ISI) can be a significant concern in a communications system.

A known approach to avoid ISI and ICI is to separate the symbols in time and prefixing a guard interval (GI) to the beginning of each symbol to ensure there is no leakage of signal from the previous symbol(s) into the next symbol. This approach is simple to implement, but has some drawbacks, particularly from the integrated sensing and communication perspective. For example, to reduce ICI and ISI, hard limits need to be set for trade-offs between communications performance and sensing performance. In comparison, trade-off may be a desirable attribute for integrated sensing and communication in 6G.

Alternatively, in some embodiments successive symbols may be transmitted by overlapping the symbols in time, which may allow more efficient utilization of communications, sensing, and computation resources. Resources may be saved in a number of ways.

For example, increasing overlapping between successive symbols can reduce the frequency to perform channel estimation for communications, which would reduce the overhead for signal transmission and save computation resources.

Both communications and sensing are time-sensitive tasks. By overlapping the transmission of successive symbols in time, the inter-sensing interval can be reduced. A low latency sensing is desirable for many applications of sensing. For example, to position a user or device moving at a high speed, it is desirable to acquire the position information of the device or user more frequently than if the user or device is moving at a low speed, and transmission of a signal with short symbols for sensing purposes may be required.

Another example is that more frequent reception of symbols can improve beam-tracking and beam-recovery.

With fractional modulation, overlapping can be more easily implemented because the chirp bases inherently have desirable autocorrelation properties. The correlation between a chirp base and a frequency-shifted version of itself decreases significantly as the frequency shift increases, which result in a processing gain. A direct consequence of this property is that two chirp bases that are highly overlapping will have a negligible interference effect on each other after suitable de-spreading operation.

Figure 19:
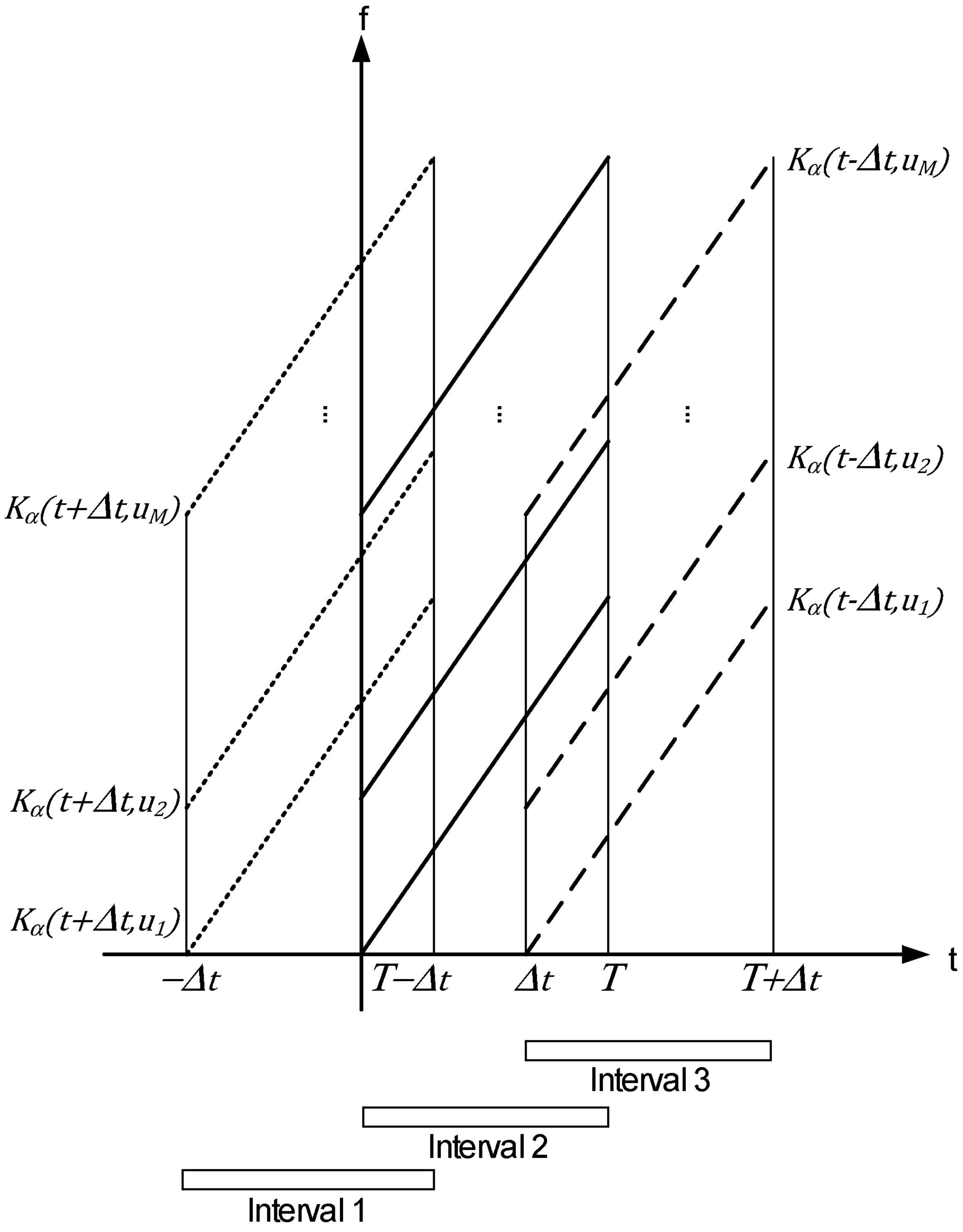
FIG. 19 is a line graph illustrating interval overlapping of frequency-modulated OFDM waveform signal symbols.

For example, Equation (1-4) may be generalized to define a sequence of 2N symbols as follows:

$$s_\alpha(t)=\sum_{l=-N}^{N}\sum_{m=1}^{M}p_{m,l}K_\alpha(t-l\Delta t,u_m), \tag{1-18}$$

where $p_{m,l}$ is the data symbol transmitted in the lth symbol over the mth chirp base. Assuming the chirp bases (kernels) have a limited interval duration T, $K_\alpha(t,u_m)\neq 0\forall t$ 531 [0, T), the chirp bases for different symbols will overlap when $|\Delta t|<T$. The effect of symbol overlapping on the decoded symbols $p_{m,l}$ may be seen, e.g., as illustrated in FIG. 19, where the intervals (Interval 1, Interval 2, Interval 3) for different symbols overlap with N=1 in Equation (1-18) and an arbitrary M.

For simplicity, it is assumed the channel is a single tap with zero-delay, then, $y(t)=s_\alpha(t)$. The symbol corresponding to l=0 in the received signal y(t) can be obtained from Equation (1-7):

$$y_r=\int_0^T y(u)K_\alpha^*(u,u_r)du,\ r=1\ \dots\ M, \tag{1-19}$$

substituting Equation (1-18) into Equation (1-19), $$y_r=\sum_{m=1}^{M}p_{m,0}\zeta_{r,m}+\sum_{l=-N}^{-1}\sum_{m=1}^{M}p_{m,l}\int_0^{T+l\Delta t}K_\alpha(t-l\Delta t,u_m)K_\alpha^*(t,u_r)+ \tag{1-20}$$

-continued $$\sum_{l=1}^{N}\sum_{m=1}^{M}p_{m,l}\int_{l\Delta t}^{T}K_\alpha(t-l\Delta t,u_m)K_\alpha^*(t,u_r),$$

where $\zeta_{r,m}$ is given in (1-10). After mathematical manipulation, $y_r$ gets simplified as $$y_r=\sum_{m=1}^{M}p_{m,0}\zeta_{r,m}+\sum_{l=-N}^{N}\sum_{m=1}^{M}p_{m,l}\zeta'_{r,m}(T-l\Delta t)\mathrm{Sinc}(\psi_{m,l,r}) \tag{1-21}$$

$$\psi_{m,l,r}=(T-l\Delta t)(l\Delta t\cot\phi+(u_m-u_r)\csc\phi)$$

$$\zeta'_{r,m}=\exp\left(2\pi i\left(\frac{u_m^2-u_r^2-l\Delta tT}{2}\cot\phi-\left(l\Delta tu_m+\frac{T+l\Delta t}{2}(u_m-u_r)\right)\csc\phi\right)\right).$$

The first term in Equation (1-21) is the desired signal to be decoded, which, in matrix form, is also given in Equation (1-8). With overlapping symbols, the double summations in Equation (1-21) is a second additive term. The double summation ISI term in Equation (1-21) is the ISI that is introduced from kernels starting at different times (i.e., l≠0) and frequencies (m=1 . . . M) on the kernels of the target (i.e., l=0). The argument $\psi_{m,l,r}$ of the Sinc in Equation (1-21) is given by is a function of many parameters. Due to the decaying behavior of Sinc, the farther a symbol is from the target symbol (i.e., larger |l|), the larger the argument $\psi_{m,l,r}$ and the smaller the magnitude of the corresponding ISI term. Thus, $\psi_{m,l,r}$ can be simplified as:

$$\psi_{m,l,r}=T(l\Delta t\cot\phi+(u_m-u_y)\csc\phi), \tag{1-22}$$

Assuming uniform spacing, $u_n=n\Delta u$, the parameters Δt and Δu may be selected such that $\mathrm{Sinc}(\psi_{m,l,r})=0$, ∀m, r, l, which yields $$\psi_{m,l,r}=T\left(l\Delta t\cot\left(\frac{\pi}{2}\alpha\right)+(m-r)\Delta u\csc\left(\frac{\pi}{2}\alpha\right)\right)\in\mathbb{Z}, \tag{1-23}$$

According to Equation (1-23), Δt and Δu may be selected in view of each other. In some embodiments disclosed herein, Δt and Δu are selected to satisfy both Equations (1-23) and to reduce ISI introduced in a multipath channel.

As described herein, in some embodiments the frequency-modulated OFDM may involve chirp overlapping with a chirp overlapping factor C. In some embodiments, consecutive transmitted symbols may also overlap.

To perform frequency-modulated OFDM processing, various parameters and information may be transmitted through signaling. In various embodiments, one or more of the following signaling mechanisms and changes to the ED 110 or TRP 170 may be adapted.

In some embodiments, an ED 110 may have integrated sensing and communication capabilities. When the ED 110 is connecting to a network through a TRP 170, the ED 110 may be adapted to provide signaling, possibly among other capability signaling, to indicate its integrated sensing and communication capabilities, such as one or more of (a) transmission capabilities including range of supported a, whether it can support data embedding, PA capability (e.g. for supported data embedding methods); and (b) reception capabilities including range of supported a, data decoding capability (e.g. ability to support non-orthogonal chirp bases), sensing detection capabilities, or the like.

In some embodiments, a TRP 170 may be adapted to provide signaling of integrated sensing and communication parameters to EDs 110, which may include one or more of resource configuration (bandwidth and time duration) of the integrated sensing and communication signal; indication of ON/OFF status of FrFT-specific blocks (depending on the implementation, such as the $(F_{-(\alpha-1)})$ precoding block, double-chirp multiplication or single-chirp multiplication per subband, or bandwidth part (BWP) in frequency domain or symbols in time domain. In some embodiments, the signaling to the ED 110 may only indicate the subband/BWP/symbol indices over which frequency-modulated OFDM waveform is activated. The signaling may also include one or more of indication of fractional domain parameter α, for the corresponding FrFT-active subbands/BWP/symbols; indication of chirp overlapping factor C, for the corresponding FrFT-active subbands/BWP/symbols, indication of data embedding method, for the corresponding FrFT-active subbands/BWP/symbols; indication of numerology (fractional spacing in time/frequency domain), including the parameters sub-chirp spacing Δf and/or Δu, for the corresponding FrFT-active subbands/BWP/symbols; indication of data channel (unicast, groupcast, multicast or broadcast); and indication of resource configuration for sensing data feedback.

The signaling of the parameters can be pre-configured or semi-statically configured through higher layer signaling including RRC and MAC-CE or dynamically configured through L1 signaling like DCI.

In some embodiments, an ED 110 may be adapted to provide signaling to a network, such as through a TRP 170, to indicate one or more of: feedback of sensing information including the delay and Doppler information; feedback of data decoding status (ACK/NACK); and feedback of the preferred change in integrated sensing and communication parameters including the fractional domain parameter, numerology and data embedding method.

The above noted signaling can provide and enable efficient usage of an integrated sensing and communication signal in a wireless network as disclosed herein, such as in terms of efficient use of computation and communications resources. The signaling mechanisms also provide flexibilities for diverse use and applications of example embodiments disclosed herein.

It is noted that any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for an apparatus, the method comprising:

obtaining a frequency modulation parameter corresponding to a frequency change rate of a frequency-modulated subcarrier;

generating an Orthogonal Frequency Division Multiplexing (OFDM)-based waveform signal comprising a plurality of frequency-modulated subcarriers, the plurality of frequency-modulated subcarriers modulated according to the obtained frequency modulation parameter; and outputting the OFDM-based waveform signal, the method further comprising:

generating a plurality of modulated symbols from a sequence of bits; and precoding the plurality of modulated symbols, according to the frequency modulation parameter, to generate a plurality of precoded symbols, wherein the OFDM-based waveform signal is generated from the plurality of precoded symbols, wherein the precoding comprises multiplication of the plurality of modulated symbols with a chirp function selected according to the frequency change rate.

2. The method of claim 1, further comprising obtaining a fractional order α based on the frequency modulation parameter, wherein the precoding further comprises fractional domain Fourier transformation of the plurality of modulated symbols to generate the plurality of precoded symbols in a fractional domain of a fractional order $[-(\alpha-1)]$.

3. The method of claim 1, wherein the precoding further comprises interleaving the plurality of modulated symbols with pilot symbols.

4. The method of claim 1, wherein the generating the OFDM-based waveform signal comprises interleaving the plurality of precoded symbols with pilot symbols.

5. The method of claim 1, wherein
the generating the plurality of modulated symbols from the sequence of bits comprises:
generating a first plurality of modulated symbols from the sequence of bits, and
discrete Fourier transform (DFT) precoding the first plurality of modulated symbols to generate a second plurality of modulated symbols; and
the precoding the plurality of modulated symbols comprises precoding the second plurality of modulated symbols, according to the frequency modulation parameter, to generate the plurality of precoded symbols.

6. The method of claim 1, further comprising obtaining an overlap parameter for indicating an overlap between a first frequency-modulated subcarrier of the plurality of frequency-modulated subcarriers and a second frequency-modulated subcarrier of the plurality of frequency-modulated subcarriers, the overlap being in at least one of a time domain or a frequency domain.

7. The method of claim 1, further comprising obtaining a frequency bandwidth parameter for indicating a frequency bandwidth associated with the plurality of frequency-modulated subcarriers.

8. The method of claim 1, wherein obtaining the frequency modulation parameter comprises receiving control signaling for indicating the frequency modulation parameter and at least one of a symbol duration, a frequency-modulated subcarrier spacing, or an overlap parameter.

9. A method for an apparatus, the method comprising:
obtaining a frequency modulation parameter corresponding to a frequency change rate of a frequency-modulated subcarrier;
receiving an Orthogonal Frequency Division Multiplexing (OFDM)-based waveform signal comprising a plurality of frequency-modulated subcarriers, the plurality of frequency-modulated subcarriers modulated according to the frequency modulation parameter; and
decoding the plurality of frequency-modulated subcarriers,
wherein the received OFDM-based waveform signal is generated from a plurality of precoded symbols generated from multiplication of a plurality of modulated symbols with a chirp function selected according to the frequency change rate.

10. The method of claim 9, comprising obtaining a fractional order $\alpha$ based on the frequency modulation parameter, wherein the received OFDM-based waveform signal is generated from the plurality of precoded symbols further generated from fractional domain Fourier transformation, in a fractional domain of a fractional order $[-(\alpha-1)]$, of the plurality of modulated symbols.

11. The method of claim 10, wherein the plurality of modulated symbols are interleaved with pilot symbols in the plurality of precoded symbols, and the decoding comprises channel equalization based on the pilot symbols.

12. The method of claim 10, wherein the plurality of precoded symbols are interleaved with pilot symbols in the OFDM-based waveform signal, and the decoding comprises channel equalization based on the pilot symbols.

13. The method of claim 9, further comprising obtaining an overlap parameter for indicating an overlap between a first frequency-modulated subcarrier of the plurality of frequency-modulated subcarriers and a second frequency-modulated subcarrier of the plurality of frequency-modulated subcarriers, the overlap being in at least one of a time domain or a frequency domain.

14. The method of claim 9, further comprising obtaining a frequency bandwidth parameter for indicating a frequency bandwidth associated with the plurality of frequency-modulated subcarriers.

15. The method of claim 9, wherein obtaining the frequency modulation parameter comprises receiving control signaling for indicating the frequency modulation parameter and at least one of a symbol duration, a frequency-modulated subcarrier spacing, or an overlap parameter.

16. The method of claim 9, further comprising transmitting control signaling for indicating the frequency modulation parameter and at least one of a symbol duration, a frequency-modulated subcarrier spacing, or an overlap parameter.

17. The method of claim 9, wherein the OFDM-based waveform signal comprises a cyclic prefix (CP).

18. An apparatus comprising:
a memory to store processor-executable instructions; and
a processor to execute the processor-executable instructions to cause the apparatus to perform a method comprising:
obtaining a frequency modulation parameter corresponding to a frequency change rate of a frequency-modulated subcarrier, and
transmitting or receiving an Orthogonal Frequency Division Multiplexing (OFDM)-based waveform signal comprising a plurality of frequency-modulated subcarriers, the plurality of frequency-modulated subcarriers modulated according to the obtained frequency modulation parameter,
wherein the OFDM-based waveform signal is generated from a plurality of precoded symbols generated from multiplication of a plurality of modulated symbols with a chirp function selected according to the frequency change rate.

* * * * *